(12) United States Patent
Chen et al.

(10) Patent No.: US 10,582,378 B2
(45) Date of Patent: Mar. 3, 2020

(54) MESSAGE PROTECTION METHOD, USER EQUIPMENT, AND CORE NETWORK DEVICE

(71) Applicant: HUAWEI TECHNOLOGIES CO., LTD., Shenzhen, Guangdong (CN)

(72) Inventors: Jing Chen, Shanghai (CN); Li Hu, Shanghai (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/520,833

(22) Filed: Jul. 24, 2019

(65) Prior Publication Data

US 2019/0349753 A1   Nov. 14, 2019

Related U.S. Application Data

(63) Continuation of application No. PCT/CN2017/072665, filed on Jan. 25, 2017.

(51) Int. Cl.
*H04L 9/00* (2006.01)
*H04W 12/00* (2009.01)
*H04W 12/04* (2009.01)
*H04W 4/14* (2009.01)
*H04L 9/06* (2006.01)
*H04L 9/08* (2006.01)
(Continued)

(52) U.S. Cl.
CPC ......... *H04W 12/003* (2019.01); *H04L 9/0643* (2013.01); *H04L 9/0869* (2013.01); *H04L 9/3247* (2013.01); *H04W 4/14* (2013.01); *H04W 12/001* (2019.01); *H04W 12/04071* (2019.01); *H04W 12/1008* (2019.01)

(58) Field of Classification Search
CPC ... H04L 63/08; H04L 63/061; H04L 63/0823; H04L 9/0861; H04L 9/14; H04L 9/30; H04L 9/3239; H04L 9/3247; H04L 9/3263; H04L 63/205; H04L 63/0492; H04L 63/0815; H04L 67/125; H04L 63/0435; H04L 63/105; H04L 9/3271; H04L 2209/24; H04L 2209/60; H04W 12/02; H04W 12/06
See application file for complete search history.

(56) References Cited

U.S. PATENT DOCUMENTS

| | | | | |
|---|---|---|---|---|
| 2008/0010455 A1* | 1/2008 | Holtzman | ............. | H04L 9/3228 713/168 |
| 2012/0323717 A1* | 12/2012 | Kirsch | ............... | G06Q 20/0855 705/26.1 |
| 2014/0108810 A1* | 4/2014 | Chenna | ................... | H04L 9/321 713/179 |

* cited by examiner

*Primary Examiner* — Quan M Hua
(74) *Attorney, Agent, or Firm* — Womble Bond Dickinson (US) LLP

(57) ABSTRACT

A message protection method, user equipment, and a core network device are disclosed. The method includes: sending a request message on which no security protection is performed to the core network device, where the request message includes a first random number; receiving an abnormal response message, where the abnormal response message includes a third random number and a signature; and determining, based on the third random number, the signature, and an obtained credential, whether the abnormal response message is a valid message. According to the message protection method provided in the embodiments of the disclosure, security protection can be performed on a message transmitted before a security context is established between the user equipment and the core network device, so as to improve network communication security.

20 Claims, 14 Drawing Sheets

(51) Int. Cl.
*H04L 9/32* (2006.01)
*H04W 12/10* (2009.01)

MESSAGE PROTECTION METHOD, USER EQUIPMENT, AND CORE NETWORK DEVICE

CROSS-REFERENCE TO RELATED APPLICATIONS

This application is a continuation of International Application No. PCT/CN2017/072665, filed on Jan. 25, 2017, the disclosure of which is hereby incorporated by reference in its entirety.

TECHNICAL FIELD

The disclosure relates to the field of communications technologies, and in particular, to a message protection method, user equipment, and a core network device.

BACKGROUND

In some initial access scenarios in a long term evolution (LTE) communications system, no security protection is performed on messages transmitted before a security context is established between user equipment (UE) and a network side device. Consequently, these messages may encounter a forgery or replay attack.

FIG. 1 is a message exchange diagram of an existing forgery attack. As shown in FIG. 1, network elements may include UE, a pseudo base station, an access network device, and a core network device. The pseudo base station is an unauthorized base station disposed by an attacker to attract the UE to camp on. The access network device and the core network device are network side devices when the UE normally accesses a network. When the UE sends a request message 1 on which no security protection is performed, the pseudo base station directly intercepts the request message 1, and forges an abnormal response message 1. The pseudo base station sends the forged abnormal response message 1 to the UE, causing long-time denial of service of the UE. The access network device and the core network device possibly cannot receive the request message 1 sent by the UE.

FIG. 2 is a message exchange diagram of an existing replay attack. As shown in FIG. 2, the UE sends a request message 2 on which no security protection is performed. After intercepting the request message 2, the pseudo base station forwards the request message 2 to the core network device. The request message 2 may be rejected by the core network device. In this case, the core network device returns an abnormal response message 2. After caching the abnormal response message 2, the pseudo base station forwards the abnormal response message 2 to the UE. In this case, the UE cannot access a network for a normal reason. Then, the UE initiates a request again, and sends a request message 3. After intercepting the request message 3, the pseudo base station sends the previously cached abnormal response message 2 to the UE, causing long-time denial of service of the UE again. In this case, the denial of service is abnormal denial of service caused by a replay attack. The access network device and the core network device possibly cannot receive the request message 3 sent by the UE.

Currently, messages that are transmitted between the UE and the network side device and on which no security protection is performed may encounter a forgery or replay attack, and there is no method for identifying and protecting these messages. Consequently, abnormal long-time denial of service of the UE is caused, and network communication security is reduced.

SUMMARY

Embodiments of the disclosure provide a message protection method, user equipment, and a core network device, so as to perform security protection on a message transmitted before a security context is established between the user equipment and the core network device, thereby improving network communication security.

According to a first aspect, an embodiment of the present disclosure provides a message protection method, where the method may include: sending a request message on which no security protection is performed to a core network device; receiving an abnormal response message; and determining, based on a third random number, a signature, and an obtained credential, whether the abnormal response message is a valid message.

According to the message protection method provided in the first aspect, by using a first random number and the signature, security protection can be performed on a message transmitted before a security context is established between user equipment and the core network device, so that the user equipment can identify whether the received abnormal response message is a valid message. Therefore, long-time denial of service of the user equipment that is caused by a forgery attack or a replay attack made by a pseudo base station is avoided, so as to improve network communication security.

In one embodiment, in a possible implementation of the first aspect, the determining, based on a third random number, a signature, and an obtained credential, whether the abnormal response message is a valid message includes: if a first random number is the same as the third random number, and signature verification succeeds, determining that the abnormal response message is a valid message, where that signature verification succeeds includes: signature verification performed on the abnormal response message based on the third random number, the signature, and the credential succeeds.

In the message protection method provided in this possible implementation, an input parameter used by the core network device to generate the signature includes the first random number and a key; and the user equipment may perform signature verification on the received abnormal response message based on the first random number, the third random number, the received signature, and the obtained credential, to determine whether the received abnormal response message is a valid message. Therefore, long-time denial of service of the user equipment that is caused by a forgery attack or a replay attack made by a pseudo base station can be avoided by using the first random number, the third random number, and the signature, so as to improve network communication security.

In one embodiment, in a possible implementation of the first aspect, the abnormal response message may further include a second random number, and the determining, based on a third random number, a signature, and an obtained credential, whether the abnormal response message is a valid message includes: if a first random number is the same as the third random number, and signature verification succeeds, determining that the abnormal response message is a valid message, where that signature verification succeeds includes: signature verification performed on the abnormal response message based on the third random number, the second random number, the signature, and the credential succeeds.

In the message protection method provided in this possible implementation, an input parameter used by the core network device to generate the signature includes the first random number, the second random number, and a key; and the user equipment may perform signature verification on the received abnormal response message based on the first random number, the second random number, the third random number, the received signature, and the obtained credential, to determine whether the received abnormal response message is a valid message. Therefore, long-time denial of service of the user equipment that is caused by a forgery attack or a replay attack made by a pseudo base station can be avoided by using the first random number, the second random number, the third random number, and the signature, so as to improve network communication security.

In one embodiment, in a possible implementation of the first aspect, the method further includes: determining a second hash value based on the request message; and the determining, based on a third random number, a signature, and an obtained credential, whether the abnormal response message is a valid message includes: if a first random number is the same as the third random number, and signature verification succeeds, determining that the abnormal response message is a valid message, where that signature verification succeeds includes: signature verification performed on the abnormal response message based on the third random number, the second hash value, the signature, and the credential succeeds.

In the message protection method provided in this possible implementation, an input parameter used by the core network device to generate the signature includes the first random number, a first hash value, and a key; and the user equipment may perform signature verification on the received abnormal response message based on the first random number, the second hash value, the third random number, the received signature, and the obtained credential, to determine whether the received abnormal response message is a valid message. Therefore, long-time denial of service of the user equipment that is caused by a forgery, replay, or tampering attack made by a pseudo base station can be avoided by using the first random number, the third random number, the first hash value, the second hash value, and the signature, so as to improve network communication security.

In one embodiment, in a possible implementation of the first aspect, the method further includes: determining a second hash value based on the request message, where the abnormal response message further includes a first hash value, and the first hash value is determined by the core network device based on the request message; and the determining, based on a third random number, a signature, and an obtained credential, whether the abnormal response message is a valid message includes: if a first random number is the same as the third random number, the first hash value is the same as the second hash value, and signature verification succeeds, determining that the abnormal response message is a valid message, where that signature verification succeeds includes: signature verification performed on the abnormal response message based on the third random number, the first hash value, the signature, and the credential succeeds.

In the message protection method provided in this possible implementation, an input parameter used by the core network device to generate the signature includes the first random number, the first hash value, and a key; the core network device sends the first hash value to the user equipment; and the user equipment may perform signature verification on the received abnormal response message based on the first random number, the third random number, the first hash value, the received signature, and the obtained credential, to determine whether the received abnormal response message is a valid message. Therefore, long-time denial of service of the user equipment that is caused by a forgery, replay, or tampering attack made by a pseudo base station can be avoided by using the first random number, the third random number, the first hash value, the second hash value, and the signature, so as to improve network communication security.

In one embodiment, in a possible implementation of the first aspect, the method further includes: determining a second hash value based on the request message, where the abnormal response message further includes a second random number; and the determining, based on a third random number, a signature, and an obtained credential, whether the abnormal response message is a valid message includes: if a first random number is the same as the third random number, and signature verification succeeds, determining that the abnormal response message is a valid message, where that signature verification succeeds includes: signature verification performed on the abnormal response message based on the third random number, the second random number, the second hash value, the signature, and the credential succeeds.

In the message protection method provided in this possible implementation, an input parameter used by the core network device to generate the signature includes the first random number, the second random number, a first hash value, and a key; and the user equipment may perform signature verification on the received abnormal response message based on the first random number, the second random number, the third random number, the second hash value, the received signature, and the obtained credential, to determine whether the received abnormal response message is a valid message. Therefore, long-time denial of service of the user equipment that is caused by a forgery, replay, or tampering attack made by a pseudo base station can be avoided by using the first random number, the second random number, the third random number, the first hash value, the second hash value, and the signature, so as to improve network communication security.

In one embodiment, in a possible implementation of the first aspect, the method further includes: determining a second hash value based on the request message, where the abnormal response message further includes a second random number and a first hash value, and the first hash value is determined by the core network device based on the request message; and the determining, based on a third random number, a signature, and an obtained credential, whether the abnormal response message is a valid message includes: if a first random number is the same as the third random number, the first hash value is the same as the second hash value, and signature verification succeeds, determining that the abnormal response message is a valid message, where that signature verification succeeds includes: signature verification performed on the abnormal response message based on the third random number, the second random number, the first hash value, the signature, and the credential succeeds.

In the message protection method provided in this possible implementation, an input parameter used by the core network device to generate the signature includes the first random number, the second random number, the first hash value, and a key; the core network device sends the first hash value to the user equipment; and the user equipment may perform signature verification on the received abnormal response message based on the first random number, the second random number, the third random number, the second hash value, the received signature, and the pre-obtained credential, to determine whether the received abnormal response message is a valid message. Therefore, long-time denial of service of the user equipment that is caused by a forgery, replay, or tampering attack made by a pseudo base station can be avoided by using the first random number, the second random number, the third random number, the first hash value, the second hash value, and the signature, so as to improve network communication security.

In one embodiment, in a possible implementation of the first aspect, the request message may include an attach request message or a tracking area update request message.

In one embodiment, in a possible implementation of the first aspect, the abnormal response message may include an attach reject message, a tracking area update reject message, or an identity request message.

In one embodiment, in a possible implementation of the first aspect, the abnormal response message may further include the credential, and the credential is used to verify the signature.

In the message protection method provided in this possible implementation, an implementation of obtaining the credential by the user equipment is provided. Therefore, the user equipment can obtain the credential carried in the abnormal response message, to verify the signature in the abnormal response message based on the credential.

In one embodiment, in a possible implementation of the first aspect, the method may further include: if the abnormal response message is an invalid message, changing an accessed access network device, and resending the request message to the core network device by using a changed access network device.

In the message protection method provided in this possible implementation, a method of processing performed by the user equipment when determining that the received abnormal response message is an invalid message. The user equipment changes the access network device, and resends the request message, so as to improve network communication security.

In one embodiment, in a possible implementation of the first aspect, user equipment may pre-configure the credential.

In one embodiment, in a possible implementation of the first aspect, the user equipment may obtain the credential from a message received before the abnormal response message.

In one embodiment, in a possible implementation of the first aspect, if the abnormal response message received by the user equipment further includes the credential, the user equipment may obtain the credential by using the abnormal response message.

In one embodiment, in a possible implementation of the first aspect, if determining that the received abnormal response message is a valid message, the user equipment performs a first operation based on the abnormal response message, where the first operation is an operation performed by the user equipment on a valid abnormal response message; or if determining that the received abnormal response message is an invalid message, the user equipment does not process the abnormal response message, but performs a second operation, where the second operation is an operation performed by the user equipment on an invalid abnormal response message.

According to a second aspect, an embodiment of the present disclosure provides a message protection method, where the method may include: receiving a request message that is sent by user equipment and on which no security protection is performed; if the request message does not meet a preset condition, generating an abnormal response message; and sending the abnormal response message to the user equipment.

In one embodiment, in a possible implementation of the second aspect, that a signature is generated based on an input parameter including a first random number may include: the signature is generated for the abnormal response message based on a pre-obtained key and the first random number.

In one embodiment, in a possible implementation of the second aspect, the method may further include: generating a second random number, where the abnormal response message further includes the second random number; and that a signature is generated based on an input parameter including a first random number includes: the signature is generated for the abnormal response message based on a pre-obtained key, the first random number, and the second random number.

In one embodiment, in a possible implementation of the second aspect, the method may further include: determining a first hash value based on the request message; and that a signature is generated based on an input parameter including a first random number includes: the signature is generated for the abnormal response message based on a pre-obtained key, the first random number, and the first hash value.

In one embodiment, in a possible implementation of the second aspect, the method may further include: generating a second random number; and determining a first hash value based on the request message, where the abnormal response message further includes the second random number; and that a signature is generated based on an input parameter including a first random number includes: the signature is generated for the abnormal response message based on a pre-obtained key, the first random number, the second random number, and the first hash value.

In one embodiment, in a possible implementation of the second aspect, the abnormal response message may further include the first hash value.

In one embodiment, in a possible implementation of the second aspect, the request message may include an attach request message or a tracking area update request message.

In one embodiment, in a possible implementation of the second aspect, the abnormal response message may include an attach reject message, a tracking area update reject message, or an identity request message.

In one embodiment, in a possible implementation of the second aspect, the abnormal response message may further include a credential, and the credential is used by the user equipment to verify the signature.

According to a third aspect, an embodiment of the present disclosure provides user equipment, where the user equipment may include: a transceiver, configured to: send a request message on which no security protection is performed to a core network device; and receive an abnormal response message; and a processor, configured to determine, based on a third random number, a signature, and an obtained credential, whether the abnormal response message is a valid message.

In one embodiment, in a possible implementation of the third aspect, the processor is specifically configured to: if a first random number is the same as the third random number, and signature verification succeeds, determine that the abnormal response message is a valid message, where that signature verification succeeds includes: signature verification performed on the abnormal response message based on the third random number, the signature, and the credential succeeds.

In one embodiment, in a possible implementation of the third aspect, the abnormal response message may further include a second random number, and the processor is specifically configured to: if a first random number is the same as the third random number, and signature verification succeeds, determine that the abnormal response message is a valid message, where that signature verification succeeds includes: signature verification performed on the abnormal response message based on the third random number, the second random number, the signature, and the credential succeeds.

In one embodiment, in a possible implementation of the third aspect, the processor is further configured to determine a second hash value based on the request message; and the processor is specifically configured to: if a first random number is the same as the third random number, and signature verification succeeds, determine that the abnormal response message is a valid message, where that signature verification succeeds includes: signature verification performed on the abnormal response message based on the third random number, the second hash value, the signature, and the credential succeeds.

In one embodiment, in a possible implementation of the third aspect, the processor is further configured to determine a second hash value based on the request message, where the abnormal response message further includes a first hash value, and the first hash value is determined by the core network device based on the request message; and the processor is specifically configured to: if a first random number is the same as the third random number, the first hash value is the same as the second hash value, and signature verification succeeds, determine that the abnormal response message is a valid message, where that signature verification succeeds includes: signature verification performed on the abnormal response message based on the third random number, the first hash value, the signature, and the credential succeeds.

In one embodiment, in a possible implementation of the third aspect, the processor is further configured to determine a second hash value based on the request message, where the abnormal response message further includes a second random number; and the processor is specifically configured to: if a first random number is the same as the third random number, and signature verification succeeds, determine that the abnormal response message is a valid message, where that signature verification succeeds includes: signature verification performed on the abnormal response message based on the third random number, the second random number, the second hash value, the signature, and the credential succeeds.

In one embodiment, in a possible implementation of the third aspect, the processor is further configured to determine a second hash value based on the request message, where the abnormal response message further includes a second random number and a first hash value, and the first hash value is determined by the core network device based on the request message; and the processor is specifically configured to: if a first random number is the same as the third random number, the first hash value is the same as the second hash value, and signature verification succeeds, determine that the abnormal response message is a valid message, where that signature verification succeeds includes: signature verification performed on the abnormal response message based on the third random number, the second random number, the first hash value, the signature, and the credential succeeds.

In one embodiment, in a possible implementation of the third aspect, the request message may include an attach request message or a tracking area update request message.

In one embodiment, in a possible implementation of the third aspect, the abnormal response message may include an attach reject message, a tracking area update reject message, or an identity request message.

In one embodiment, in a possible implementation of the third aspect, the abnormal response message may further include the credential, and the credential is used to verify the signature.

In one embodiment, in a possible implementation of the third aspect, the processor is further configured to: if determining that the abnormal response message is an invalid message, change an accessed access network device; and the transceiver is further configured to resend the request message to the core network device by using a changed access network device.

According to a fourth aspect, an embodiment of the present disclosure provides a core network device, where the core network device may include: a transceiver, configured to: receive a request message that is sent by user equipment and on which no security protection is performed; and send an abnormal response message generated by a processor to the user equipment; and the processor, configured to: when the request message does not meet a preset condition, generate the abnormal response message.

In one embodiment, in a possible implementation of the fourth aspect, the processor is specifically configured to generate a signature for the abnormal response message based on a pre-obtained key and a first random number.

In one embodiment, in a possible implementation of the fourth aspect, the processor is further configured to generate a second random number, where the abnormal response message further includes the second random number; and the processor is specifically configured to generate a signature for the abnormal response message based on a pre-obtained key, a first random number, and the second random number.

In one embodiment, in a possible implementation of the fourth aspect, the processor is further configured to determine a first hash value based on the request message; and the processor is specifically configured to generate a signature for the abnormal response message based on a pre-obtained key, a first random number, and the first hash value.

In one embodiment, in a possible implementation of the fourth aspect, the processor is further configured to generate a second random number; and determine a first hash value based on the request message, where the abnormal response message further includes the second random number; and the processor is specifically configured to generate a signature for the abnormal response message based on a pre-obtained key, a first random number, the second random number, and the first hash value.

In one embodiment, in a possible implementation of the fourth aspect, the abnormal response message further includes the first hash value.

In one embodiment, in a possible implementation of the fourth aspect, the request message includes an attach request message or a tracking area update request message.

In one embodiment, in a possible implementation of the fourth aspect, the abnormal response message includes an attach reject message, a tracking area update reject message, or an identity request message.

In one embodiment, in a possible implementation of the fourth aspect, the abnormal response message further includes a credential, and the credential is used by the user equipment to verify the signature.

According to a fifth aspect, an embodiment of the present disclosure provides user equipment, where the user equipment may include: a transceiver module, configured to: send a request message on which no security protection is performed to a core network device; and receive an abnormal response message; and a processing module, configured to determine, based on a third random number, a signature, and an obtained credential, whether the abnormal response message is a valid message.

In one embodiment, in a possible implementation of the fifth aspect, the processing module is specifically configured to: if a first random number is the same as the third random number, and signature verification succeeds, determine that the abnormal response message is a valid message, where that signature verification succeeds includes: signature verification performed on the abnormal response message based on the third random number, the signature, and the credential succeeds.

In one embodiment, in a possible implementation of the fifth aspect, the abnormal response message may further include a second random number, and the processing module is specifically configured to: if a first random number is the same as the third random number, and signature verification succeeds, determine that the abnormal response message is a valid message, where that signature verification succeeds includes: signature verification performed on the abnormal response message based on the third random number, the second random number, the signature, and the credential succeeds.

In one embodiment, in a possible implementation of the fifth aspect, the processing module is further configured to determine a second hash value based on the request message; and the processing module is specifically configured to: if a first random number is the same as the third random number, and signature verification succeeds, determine that the abnormal response message is a valid message, where that signature verification succeeds includes: signature verification performed on the abnormal response message based on the third random number, the second hash value, the signature, and the credential succeeds.

In one embodiment, in a possible implementation of the fifth aspect, the processing module is further configured to determine a second hash value based on the request message, where the abnormal response message further includes a first hash value, and the first hash value is determined by the core network device based on the request message; and the processing module is specifically configured to: if a first random number is the same as the third random number, the first hash value is the same as the second hash value, and signature verification succeeds, determine that the abnormal response message is a valid message, where that signature verification succeeds includes: signature verification performed on the abnormal response message based on the third random number, the first hash value, the signature, and the credential succeeds.

In one embodiment, in a possible implementation of the fifth aspect, the processing module is further configured to determine a second hash value based on the request message, where the abnormal response message further includes a second random number; and the processing module is specifically configured to: if a first random number is the same as the third random number, and signature verification succeeds, determine that the abnormal response message is a valid message, where that signature verification succeeds includes: signature verification performed on the abnormal response message based on the third random number, the second random number, the second hash value, the signature, and the credential succeeds.

In one embodiment, in a possible implementation of the fifth aspect, the processing module is further configured to determine a second hash value based on the request message, where the abnormal response message further includes a second random number and a first hash value, and the first hash value is determined by the core network device based on the request message; and the processing module is specifically configured to: if a first random number is the same as the third random number, the first hash value is the same as the second hash value, and signature verification succeeds, determine that the abnormal response message is a valid message, where that signature verification succeeds includes: signature verification performed on the abnormal response message based on the third random number, the second random number, the first hash value, the signature, and the credential succeeds.

In one embodiment, in a possible implementation of the fifth aspect, the request message may include an attach request message or a tracking area update request message.

In one embodiment, in a possible implementation of the fifth aspect, the abnormal response message may include an attach reject message, a tracking area update reject message, or an identity request message.

In one embodiment, in a possible implementation of the fifth aspect, the abnormal response message may further include the credential, and the credential is used to verify the signature.

In one embodiment, in a possible implementation of the fifth aspect, the processing module is further configured to: if determining that the abnormal response message is an invalid message, change an accessed access network device; and the transceiver module is further configured to resend the request message to the core network device by using a changed access network device.

According to a sixth aspect, an embodiment of the present disclosure provides a core network device, where the core network device may include: a transceiver module, configured to: receive a request message that is sent by user equipment and on which no security protection is performed; and send an abnormal response message generated by a processing module to the user equipment; and the processing module, configured to: when the request message does not meet a preset condition, generate the abnormal response message.

In one embodiment, in a possible implementation of the sixth aspect, the processing module is specifically configured to generate a signature for the abnormal response message based on a pre-obtained key and a first random number.

In one embodiment, in a possible implementation of the sixth aspect, the processing module is further configured to generate a second random number, where the abnormal response message further includes the second random number; and the processing module is specifically configured to generate a signature for the abnormal response message based on a pre-obtained key, a first random number, and the second random number.

In one embodiment, in a possible implementation of the sixth aspect, the processing module is further configured to determine a first hash value based on the request message; and the processing module is specifically configured to generate a signature for the abnormal response message based on a pre-obtained key, a first random number, and the first hash value.

In one embodiment, in a possible implementation of the sixth aspect, the processing module is further configured to generate a second random number; and determine a first hash value based on the request message, where the abnormal response message further includes the second random number; and the processing module is specifically configured to generate a signature for the abnormal response message based on a pre-obtained key, a first random number, the second random number, and the first hash value.

In one embodiment, in a possible implementation of the sixth aspect, the abnormal response message further includes the first hash value.

In one embodiment, in a possible implementation of the sixth aspect, the request message includes an attach request message or a tracking area update request message.

In one embodiment, in a possible implementation of the sixth aspect, the abnormal response message includes an attach reject message, a tracking area update reject message, or an identity request message.

In one embodiment, in a possible implementation of the sixth aspect, the abnormal response message further includes a credential, and the credential is used by the user equipment to verify the signature.

With reference to the first aspect and the possible implementations of the first aspect, the second aspect and the possible implementations of the second aspect, the third aspect and the possible implementations of the third aspect, the fourth aspect and the possible implementations of the fourth aspect, the fifth aspect and the possible implementations of the fifth aspect, and the sixth aspect and the possible implementations of the sixth aspect, the request message includes the first random number, the abnormal response message includes the third random number and the signature, the abnormal response message includes the first random number and the signature, and the signature is generated based on the input parameter including the first random number.

According to a seventh aspect, an embodiment of the disclosure further provides a computer program product, where the computer program product includes program code used to perform the message protection method provided in the first aspect of the embodiments of the disclosure.

According to an eighth aspect, an embodiment of the disclosure further provides a computer program product, where the computer program product includes program code used to perform the message protection method provided in the second aspect of the embodiments of the disclosure.

According to a ninth aspect, an embodiment of the disclosure further provides a storage medium, where the storage medium is configured to store a computer program product, the computer program product includes program code, and the program code may include program code used to perform the message protection method provided in the first aspect of the embodiments of the disclosure.

According to a tenth aspect, an embodiment of the disclosure further provides a storage medium, where the storage medium is configured to store a computer program product, the computer program product includes program code, and the program code may include program code used to perform the message protection method provided in the second aspect of the embodiments of the disclosure.

According to the message protection method, the user equipment, and the core network device that are provided in the embodiments of the disclosure, the user equipment sends the request message on which no security protection is performed to the core network device, where the request message includes the first random number; and if determining that the request message does not meet the preset condition, the core network device generates the abnormal response message, where the abnormal response message includes the first random number and the signature. In this way, by using the first random number and the signature, security protection can be performed on a message transmitted before a security context is established between the user equipment and the core network device, so that the user equipment can identify whether the received abnormal response message is a valid message. Therefore, long-time denial of service of the user equipment that is caused by a forgery attack or a replay attack made by a pseudo base station is avoided, so as to improve network communication security.

DESCRIPTION OF EMBODIMENTS

Figure 3:
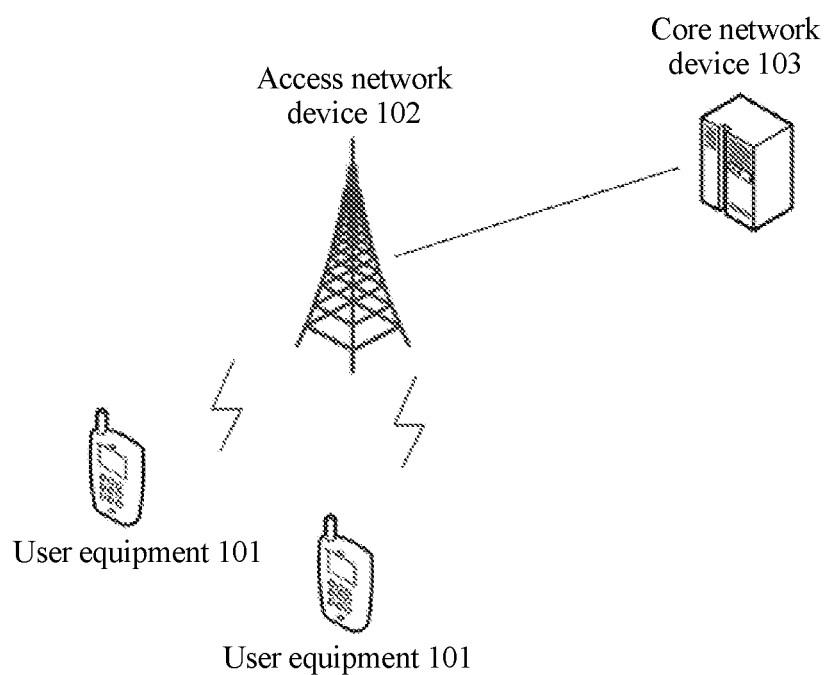
FIG. 3 is an architectural diagram of a communications system to which embodiments of the disclosure are applied.

FIG. 3 is an architectural diagram of a communications system to which embodiments of the disclosure are applied. Methods provided in the following embodiments of the disclosure may be applied to the communications system shown in FIG. 3. The communications system may be a 4G or 5G communications system or an evolved communications system thereof. As shown in FIG. 3, the communications system may include user equipment 101, an access network device 102, and a core network device 103. The access network device 102 serves the user equipment 101 by using a wireless interface. The access network device 102 communicates with the core network device 103 by using a communications interface.

It should be noted that in FIG. 3, only two user equipments 101, one access network device 102, and one core network device 103 are shown as an example. However, in the communications system shown in FIG. 3, a quantity of included user equipments 101, a quantity of included access network devices 102, a quantity of included core network devices 103, a quantity of access network devices 102 served by each core network device 103, and a quantity of user equipments 101 served by each access network device 102 are deployed based on an actual network requirement. This is not specifically limited in the disclosure.

The user equipment 101 shown in FIG. 3 may be a device that provides a user with data connectivity, a handheld device with a wireless connection function, or a wireless device connected to a wireless modem. A wireless terminal may communicate with one or more core networks through a radio access network (RAN). The wireless terminal may be a mobile terminal such as a mobile phone (also referred to as a "cellular" phone) or a computer with a mobile terminal. For example, the wireless terminal may be a portable, pocket-sized, handheld, computer built-in, or vehicle-mounted mobile apparatus that exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a subscriber unit, a subscriber station, a mobile station, a mobile console (Mobile), a remote station, an access point (AP), a remote terminal, an access terminal (AT), a user terminal, a user agent, a user device, user equipment (UE), a smartphone, an automotive device, or an internet of things device.

The access network device 102 shown in FIG. 3 may be a form of a radio station, and is a radio transceiver station that exchanges information with a mobile phone terminal in a specific radio coverage area by using a mobile switching center, or may be a device that communicates with a wireless terminal in an access network over an air interface by using one or more sectors. The access network device may be configured to perform conversion between a received over-the-air frame and an internet protocol (IP) packet, and serve as a router between the wireless terminal and the remaining part of the access network. The remaining part of the access network may include an internet protocol (IP) network. The access network device may further coordinate attribute management of the air interface. For example, the access network device may be an evolved NodeB (eNB or eNodeB) in an LTE communications system, a relay station or an access point, or a gNB in a 5G network. This is not limited herein.

The core network device 103 shown in FIG. 3 may support non-access stratum (NAS) signaling and security of the non-access stratum, tracking area list management, selection of a packet data network gateway (P-GW) and a serving gateway (S-GW), selection of an MME during a cross-mobility management entity (MME) handover, selection of a serving GPRS support node (SGSN) during a handover to a 2G/3G access system, user authentication, roaming control and bearer management, mobility management of core network nodes in different 3GPP access networks, and reachability management of UE in an idle mode. For example, the core network device may be an evolved packet core (EPC) function entity or an MME in a 4G network, or may be a mobility management function entity in the 5G network such as an access and mobility management function (AMF) entity, a common control network function (CCNF) entity, or a security anchor function (SEAF) entity.

In all the embodiments of the disclosure, messages may be exchanged between the user equipment 101 and the core network device 103 through forwarding of the access network device 102. Before the user equipment 101 transmits a message to the core network device 103, the user equipment 101 may camp on and access an access network device 102. The access network device 102 may be an authorized access network device in a communications network, or may be a pseudo base station disposed by an attacker. The user equipment 101 may send a message to the core network device 103 in the following manner: The user equipment 101 sends a message to the access network device 102, and the access network device 102 forwards the message to the core network device 103. The core network device 103 may send a message to the user equipment 101 in the following manner: The core network device 103 sends a message to the access network device 102, and the access network device 102 forwards the message to the user equipment 101.

Examples are provided below for description with reference to a plurality of instances.

Figure 4:
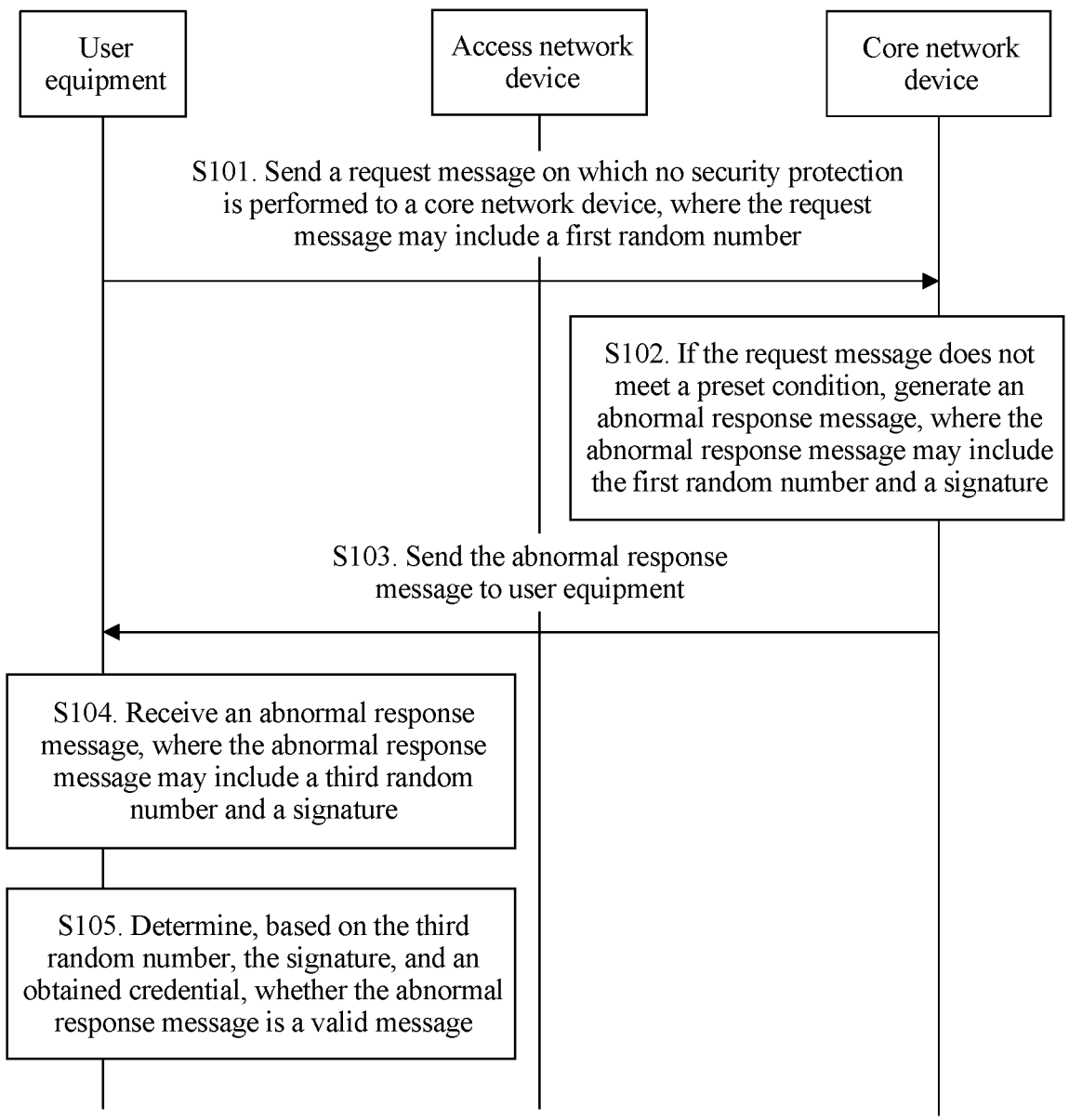
FIG. 4 is a message exchange diagram of Embodiment 1 of a message protection method according to an embodiment of the disclosure.

FIG. 4 is a message exchange diagram of Embodiment 1 of a message protection method according to an embodiment of the disclosure. In this embodiment of the disclosure, exchange between user equipment and a core network device is described. As shown in FIG. 4, the message protection method provided in this embodiment of the disclosure may include the following operations.

Operation S101. The user equipment sends a request message on which no security protection is performed to the core network device, where the request message may include a first random number.

Specifically, in the communications system shown in FIG. 3, a security context usually needs to be established between a terminal side and a core network side, to perform integrity protection and encryption protection on NAS signaling exchanged between the user equipment and the core network device. The request message on which no security protection is performed in this embodiment of the disclosure may be any message exchanged before a security context is established between the user equipment and the core network device.

In one embodiment, the request message on which no security protection is performed may include an attach request message or a tracking area update request message.

In one embodiment, the request message on which no security protection is performed may include request information. Specific content of the request information is not limited in this embodiment of the disclosure. In one embodiment, the request information may include all or a part of content of an existing request message generated by the user equipment.

The following describes the request message in this embodiment of the disclosure and the existing request message in detail by using a specific example.

Figure 1:
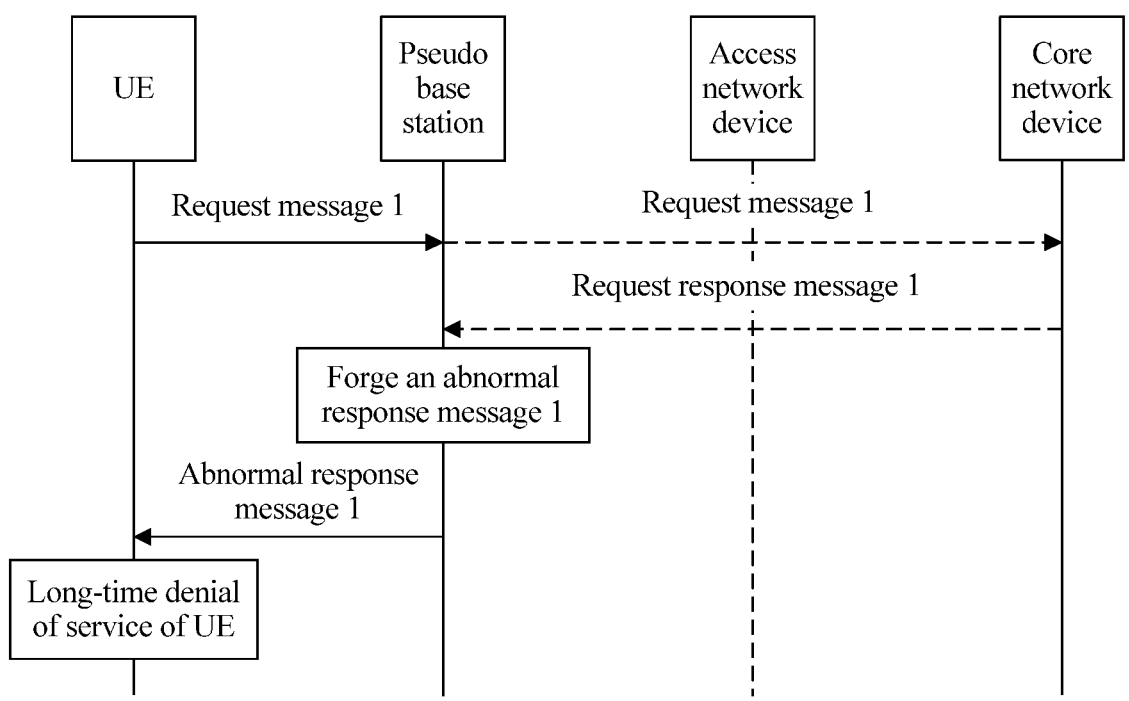
FIG. 1 is a message exchange diagram of an existing forgery attack.

As shown in FIG. 1, a request message 1 sent by the UE is the existing request message. The request message in this embodiment of the disclosure may include a first random number S1 and request information, and the request information may include all or a part of content of the request message 1.

In one embodiment, the first random number may be generated by the user equipment based on a pseudo random number generation algorithm. The pseudo random number generation algorithm may be any one of existing algorithms, for example, a Monte-Carlo method.

In one embodiment, the first random number may be obtained by the user equipment by querying a random number table. The random number table includes no repeated random number. The random number table may be periodically updated, aperiodically updated, or updated through event trigger. The random number table may be generated by the user equipment, or may be obtained by the user equipment from another device.

The user equipment temporarily saves the first random number for a period of time, to verify a third random number carried in an abnormal response message.

It should be noted that in this embodiment of the disclosure, a manner of adding the first random number to the request message and an implementation of the first random number are not particularly limited. For example, the first random number may be multi-bit binary information.

Correspondingly, the core network device may receive the request message on which no security protection is performed from the user equipment. The request message may include the first random number.

Operation S102. If determining that the request message does not meet a preset condition, the core network device generates an abnormal response message, where the abnormal response message may include the first random number and a signature, and the signature is generated based on an input parameter including the first random number.

In one embodiment, the abnormal response message may include an attach reject message, a tracking area update reject message, or an identity request message.

Specifically, the core network device determines whether the request message meets the preset condition. If the request message does not meet the preset condition, the core network device generates the abnormal response message. Correspondingly, if the request message meets the preset condition, a response message generated by the core network device may be referred to as a normal response message. The preset condition is not particularly limited in this embodiment of the disclosure. The preset condition may vary with the request message, and the abnormal response message may vary with the request message. For example, when the request message is the attach request message, and an abnormal event occurs, for example, a public land mobile network indicated in the request message is not allowed, the core network device may return a corresponding abnormal response message, namely, the attach reject message. For another example, when the request message is the tracking area update request message, and an abnormal event occurs, for example, a bearer service indicated in the request message is not allowed, the core network device may return a corresponding abnormal response message, namely, the tracking area reject message. For another example, when another abnormal event occurs in the foregoing two messages, for example, an identity carried in the request message is not identified, the core network device may return the identity request message to request the user equipment to add an authorized identity.

The first random number included in the abnormal response message is the first random number included in the request message received by the core network device from the user equipment. The core network device returns the received first random number to the user equipment by using the abnormal response message.

The input parameter for generating the signature included in the abnormal response message includes the first random number. The signature varies with the first random number. Other content included in the input parameter for generating the signature is not limited in this embodiment of the disclosure.

It should be noted that an algorithm used by the core network device to generate the signature is not particularly limited in this embodiment of the disclosure. The core network device may use any one of existing symmetric or asymmetric cryptographic algorithms, and the user equipment has a parameter and a capability of verifying the signature. When generating the signature, the core network device may pre-obtain a key, in other words, the input parameter may further include the pre-obtained key. The key that is pre-obtained by the core network device varies with the used algorithm. A specific implementation and an obtaining manner of the pre-obtained key are not particularly limited in this embodiment of the disclosure. For example, when the symmetric cryptographic algorithm is used, the UE and the core network device need to pre-configure a same symmetric key and a same signature algorithm. When the asymmetric cryptographic algorithm is used, the core network device needs to pre-configure a private key of the core network device and a signature algorithm. Before verifying the signature, the UE needs to obtain a public key corresponding to the private key and a same signature algorithm.

In one embodiment, a signature implementation procedure is as follows:

A message is used as an input of a hash function, to obtain a hash value Hm. For example, the following formula is used:

$Hm$=HASH(message), which is a formula 1, where

Hm is the hash value, HASH is the hash function, and the message includes the input parameter for generating the signature.

The signature is calculated based on the pre-obtained key and the hash value Hm. For example, the signature may be calculated by using the following formula:

Sign=$SN(Hm, K)$, which is a formula 2, where

SN is a signature function, Hm is the hash value, and K is the pre-obtained key. For example, when the symmetric cryptographic algorithm is used, K may be the symmetric key preconfigured by the core network device and the user equipment. When the asymmetric cryptographic algorithm is used, K may be the private key of the core network device. For example, when a certificate mechanism or a public/private key pair mechanism is used, K may be a private key generated by a network side. When an identity-based encryption (IBE) mechanism is used, K may be a combination of a public validation token (PVT) and a secret signing key (SSK) that are allocated by a key management system (KMS) to a network side.

In one embodiment, when the asymmetric cryptographic algorithm is used, the abnormal response message may further include a credential. The credential is used by the user equipment to verify the signature. For example, when the certificate mechanism is used, the credential may be a certificate of the core network device. When the public/private key pair mechanism is used, the credential may be a public key of the core network device. When the IBE mechanism is used, the credential may be an identity of the core network device.

In one embodiment, in an example, the generating an abnormal response message may include: generating abnormal information based on the request message. In this case, the input parameter for generating the signature may further include the abnormal information.

The abnormal information is original information generated by the core network device based on the request message. Specific content of the abnormal information is not limited in this embodiment of the disclosure. In one embodiment, the abnormal information may include all or a part of content of an existing abnormal response message generated by the core network device based on the existing request message.

The following describes the abnormal response message in this embodiment of the disclosure and the existing abnormal response message in detail by using a specific example.

Figure 2:
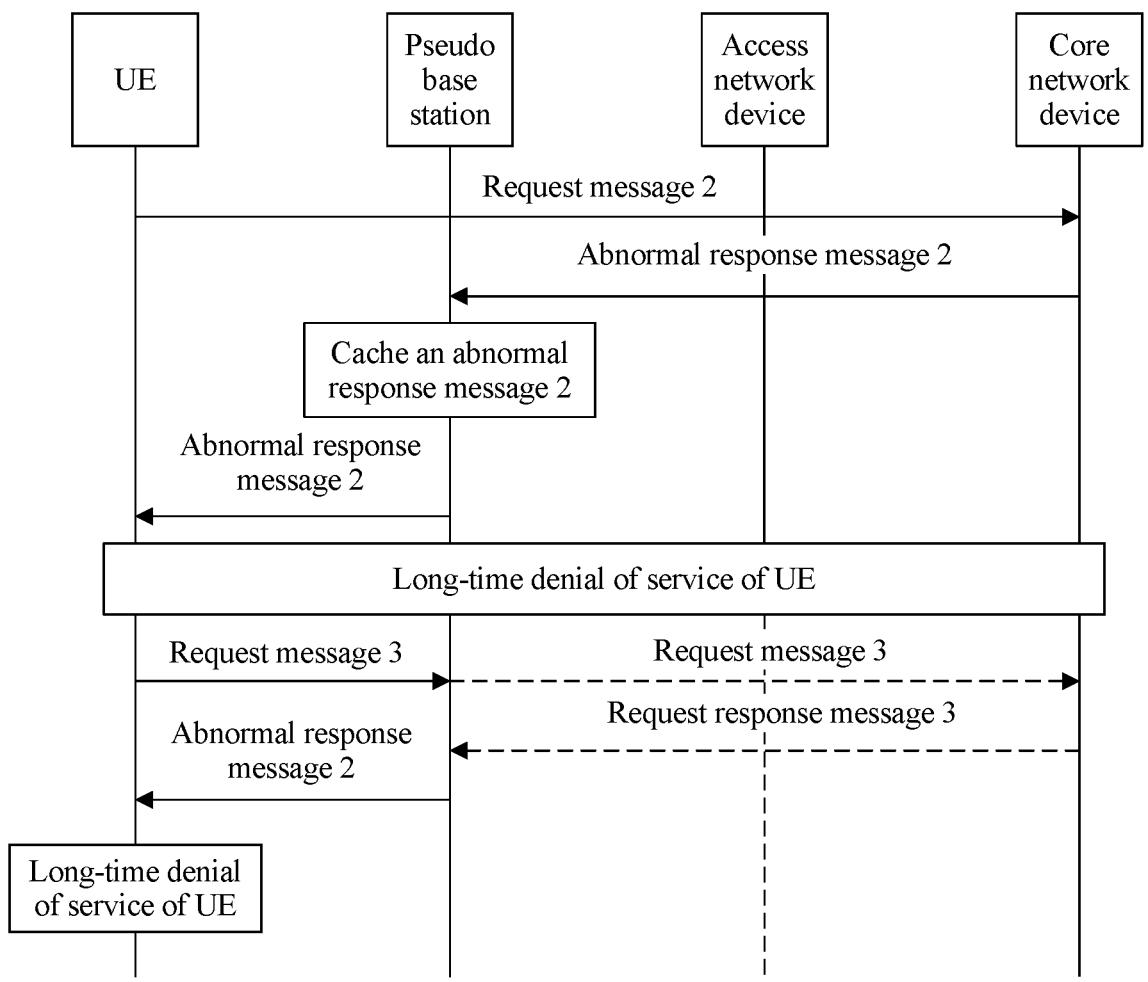
FIG. 2 is a message exchange diagram of an existing replay attack.

As shown in FIG. 2, a request message 2 sent by the UE is the existing request message. An abnormal response message 2 generated by the core network device based on the request message 2 is the existing abnormal response message. The request message in this embodiment of the disclosure may include a first random number S2 and request information, and the request information may include all or a part of content of the request message 2. The abnormal response message in this embodiment of the disclosure may include the first random number S2, the abnormal information, and the signature. The abnormal information may include all or a part of content of the abnormal response message 2.

Operation S103. The core network device sends the abnormal response message to the user equipment.

The abnormal response message in this operation is the same as the abnormal response message in S102.

Operation S104. The user equipment receives an abnormal response message, where the abnormal response message may include a third random number and a signature.

The abnormal response message in this operation may be the same as or different from the abnormal response message in S103. Further, the first random number returned by the core network device to the user equipment in S103 may be the same as or different from the third random number received by the user equipment in this operation, and the signature sent by the core network device to the user equipment in S103 may be the same as or different from the signature received by the user equipment in this operation.

Specifically, if an access network device accessed by the user equipment normally forwards a message sent by the core network device to the user equipment, the abnormal response message in this operation is the same as the abnormal response message in S103. In this case, the first random number returned by the core network device to the user equipment is the same as the third random number received by the user equipment, and the signature sent by the core network device to the user equipment is the same as the signature received by the user equipment. However, if the access network device accessed by the user equipment is a pseudo base station, when a forgery attack or a replay attack is made, the abnormal response message in this operation may be different from the abnormal response message in S103. In this case, the first random number returned by the core network device to the user equipment may be different from the third random number received by the user equipment, and the signature sent by the core network device to the user equipment may also be different from the signature received by the user equipment.

In one embodiment, the abnormal response message received by the user equipment may further include a credential. The credential may be used by the user equipment to verify the signature.

Similar to the foregoing principle, the credential sent by the core network device to the user equipment may be the same as or different from the credential received by the user equipment in this operation. However, the user equipment has a capability of verifying validity of the credential. For example, when the certificate mechanism is used, the credential may be the certificate of the core network device, and the user equipment verifies validity of the certificate by verifying a signature of the certificate authority. For example, when the public/private key pair mechanism is used, the credential may be the public key of the core network device, and the user equipment verifies validity of the public key by trusting a broadcast of the access network device. For example, when the IBE mechanism is used, the credential may be the identity of the core network device, and the user equipment verifies validity of the identity because a PVT is preconfigured.

Operation S105. The user equipment determines, based on the third random number, the signature, and an obtained credential, whether the abnormal response message is a valid message.

Specifically, the user equipment generates the first random number, and sends the first random number to the core network device by using the request message. The user equipment receives the abnormal response message, and the abnormal response message includes the third random number. It may be understood that, if the abnormal response message sent by the core network device to the user equipment does not encounter a forgery attack or a replay attack, the first random number sent by the user equipment is the same as the third random number received by the user equipment. Therefore, the user equipment may determine, based on the received third random number, whether the received abnormal response message is corresponding to the request message. In addition, the signature generated by the core network device is generated based on the first random number, and the signature varies with the first random number. Therefore, the user equipment may determine, based on the received third random number, the signature, and the obtained credential, whether the received abnormal response message is a valid message.

Specifically, for the forgery attack scenario shown in FIG. 1, according to the message protection method provided in this embodiment of the disclosure, regardless of whether the pseudo base station forges the first random number, verification on a signature forged by the pseudo base station cannot succeed because of the signature, and the user equipment can identify an abnormal response message forged in this scenario. For the replay attack scenario shown in FIG. 2, according to the message protection method provided in this embodiment of the disclosure, because first random numbers included in two request messages consecutively sent by the UE are definitely different, signatures generated by the core network device are definitely different. In this way, the pseudo base station cannot make a replay attack by using a cached abnormal response message, and the user equipment can identify an abnormal response message replayed in this scenario.

It can be learned that by using the first random number and the signature, security protection can be performed on a message transmitted before a security context is established between the user equipment and the core network device, so that the user equipment can identify whether the received abnormal response message is a valid message. Therefore, long-time denial of service of the user equipment that is caused by an attack made by a pseudo base station is avoided, so as to improve network communication security.

In one embodiment, in another implementation of S105, the user equipment may alternatively determine, based on the first random number, the signature, and the obtained credential, whether the abnormal response message is a valid message.

Specifically, if the first random number is the same as the third random number, the first random number and the third random number may be replaced with each other. If the first random number is different from the third random number, it indicates that the abnormal response message sent by the core network device to the user equipment may encounter a forgery attack or a replay attack. In this case, it may be determined, based on the first random number, that the abnormal response message is an invalid message.

It should be noted that an implementation of obtaining the credential by the user equipment is not particularly limited in this embodiment of the disclosure, and the credential may be obtained based on a preconfigured encryption algorithm.

In one embodiment, the user equipment may pre-configure the credential. For example, when the symmetric cryptographic algorithm is used, the user equipment and the core network device may pre-configure the same symmetric key.

In one embodiment, the user equipment may obtain the credential from a message received before the abnormal response message.

In one embodiment, if the abnormal response message received by the user equipment further includes the credential, the user equipment may obtain the credential by using the abnormal response message.

In one embodiment, the method provided in this embodiment of the disclosure may further include:

If determining that the received abnormal response message is a valid message, the user equipment performs a first operation based on the abnormal response message, where the first operation is an operation performed by the user equipment on a valid abnormal response message; or if determining that the received abnormal response message is an invalid message, the user equipment does not process the abnormal response message, but performs a second operation, where the second operation is an operation performed by the user equipment on an invalid abnormal response message.

It should be noted that the first operation and the second operation are not particularly limited in this embodiment of the disclosure. The first operation may be any processing procedure performed by the user equipment after receiving the existing abnormal response message.

In one embodiment, in an example, the second operation may include:

changing an access network device accessed by the user equipment, and resending the request message to the core network device by using a changed access network device.

In one embodiment, in another example, the second operation may include:

notifying a user, so that the user determines a next operation, where in one embodiment, the user may move and restart the user equipment.

In the message protection method provided in this embodiment of the disclosure, the user equipment sends the request message on which no security protection is performed to the core network device, where the request message includes the first random number; if determining that the request message does not meet the preset condition, the core network device generates the abnormal response message, where the abnormal response message includes the first random number and the signature; the core network device sends the abnormal response message to the user equipment; the user equipment receives the abnormal response message, where the abnormal response message includes the third random number and the signature; and the user equipment determines, based on the third random number, the signature, and the obtained credential, whether the received abnormal response message is a valid message. According to the message protection method provided in this embodiment of the disclosure, by using the first random number and the signature, security protection can be performed on a message transmitted before a security context is established between the user equipment and the core network device, so that the user equipment can identify whether the received abnormal response message is a valid message. Therefore, long-time denial of service of the user equipment that is caused by a forgery attack or a replay attack made by a pseudo base station is avoided, so as to improve network communication security.

Figure 5:
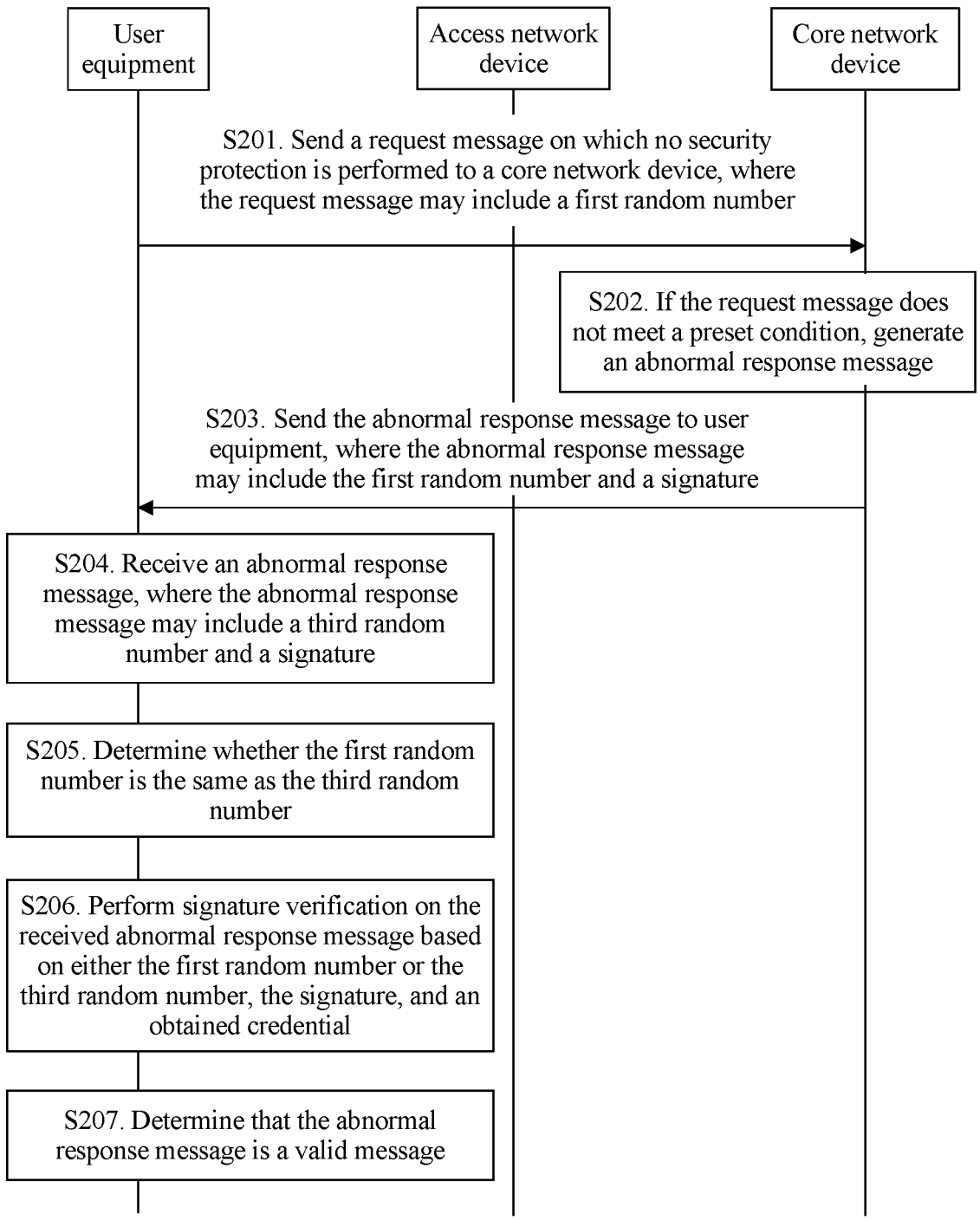
FIG. 5 is a message exchange diagram of Embodiment 2 of a message protection method according to an embodiment of the disclosure.

FIG. 5 is a message exchange diagram of Embodiment 2 of a message protection method according to an embodiment of the disclosure. Based on Embodiment 1, this embodiment of the disclosure provides an implementation of S102 and an implementation of S105. S102 may be specifically S202, and S105 may include S205 to S207. As shown in FIG. 5, the message protection method provided in this embodiment of the disclosure may include the following operations.

Operation S201. User equipment sends a request message on which no security protection is performed to a core network device, where the request message may include a first random number.

For this operation, refer to the description in S101. A principle is similar, and details are not described herein again.

Operation S202. If determining that the request message does not meet a preset condition, the core network device generates an abnormal response message.

The abnormal response message may include the first random number and a signature, and the signature is generated for the abnormal response message based on a pre-obtained key and the first random number.

For a specific implementation and an obtaining manner of the pre-obtained key, refer to the description in S102. In this case, an input parameter for generating the signature includes the pre-obtained key and the first random number.

In one embodiment, the abnormal response message may further include a credential, and the credential is used by the user equipment to verify the signature. For the credential, refer to the description in S102.

Operation S203. The core network device sends the abnormal response message to the user equipment, where the abnormal response message may include the first random number and a signature.

Operation S204. The user equipment receives an abnormal response message, where the abnormal response message may include a third random number and a signature.

For this operation, refer to the description in S104. A principle is similar, and details are not described herein again.

Operation S205. The user equipment determines whether the first random number is the same as the third random number.

If the first random number is the same as the third random number, a next step is performed. If the first random number is different from the third random number, it is determined that the received abnormal response message is an invalid message.

Operation S206. The user equipment performs signature verification on the received abnormal response message based on either the first random umber or the third random number, the signature, and an obtained credential. In this case, an input parameter for verifying the signature includes either the first random number or the third random number.

If the signature verification succeeds, a next operation is performed. If the signature verification fails, it is determined that the received abnormal response message is an invalid message.

It should be noted that an algorithm used by the user equipment to verify the signature is not particularly limited in this embodiment of the disclosure, and any of existing symmetric or asymmetric cryptographic algorithms may be used.

In one embodiment, a signature verification procedure is as follows:

A hash value Hm is obtained based on the input parameter for verifying the signature and the foregoing formula 1; a hash value Hm' is obtained based on the signature, the obtained credential, and a formula 3; Hm is compared with Hm'; and if Hm is different from Hm', the signature verification fails; or if Hm is the same as Hm', the signature verification succeeds.

$Hm'=Ver(Sign, Kv)$, which is a formula 3, where

Ver is a signature verification function, Kv is the credential, and Sign is the signature.

The signature is carried in the abnormal response message. For an obtaining manner of the credential, refer to the description in S105.

Operation S207. The user equipment determines that the received abnormal response message is a valid message.

In this embodiment of the disclosure, the input parameter used by the core network device to generate the signature includes the first random number and the pre-obtained key, and the first random number is generated and sent by the user equipment to the core network device. The generated signature varies as long as one of the first random number and the pre-obtained key varies. Therefore, by using the first random number and the signature, security protection can be performed on a message transmitted before a security context is established between the user equipment and the core network device.

Specifically, for the forgery attack scenario shown in FIG. 1, regardless of whether the pseudo base station forges the first random number, the pseudo base station cannot obtain a valid signature key, and because of the signature, the user equipment can identify an abnormal response message forged in this scenario. For the replay attack scenario shown in FIG. 2, because first random numbers included in two request messages consecutively sent by the UE are definitely different, two signatures consecutively generated by the core network device are definitely different. In this way, the user equipment can identify an abnormal response message replayed in this scenario.

It should be noted that a sequence of performing S205 and S206 is not limited in this embodiment of the disclosure.

In one embodiment, in another example, S105 in which the user equipment determines, based on the third random number, the signature, and an obtained credential, whether the abnormal response message is a valid message may include:

The user equipment performs signature verification on the received abnormal response message based on either the first random number or the third random number, the signature, and the obtained credential;

if the signature verification succeeds, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In the message protection method provided in this embodiment of the disclosure, the input parameter used by the core network device to generate the signature includes the first random number and the pre-obtained key; and the user equipment may perform signature verification on the received abnormal response message based on the first random number, the third random number, the received signature, and the obtained credential, to determine whether the received abnormal response message is a valid message. According to the message protection method provided in this embodiment of the disclosure, long-time denial of service of the user equipment that is caused by a forgery attack or a replay attack made by a pseudo base station can be avoided by using the first random number, the third random number, and the signature, so as to improve network communication security.

Figure 6:
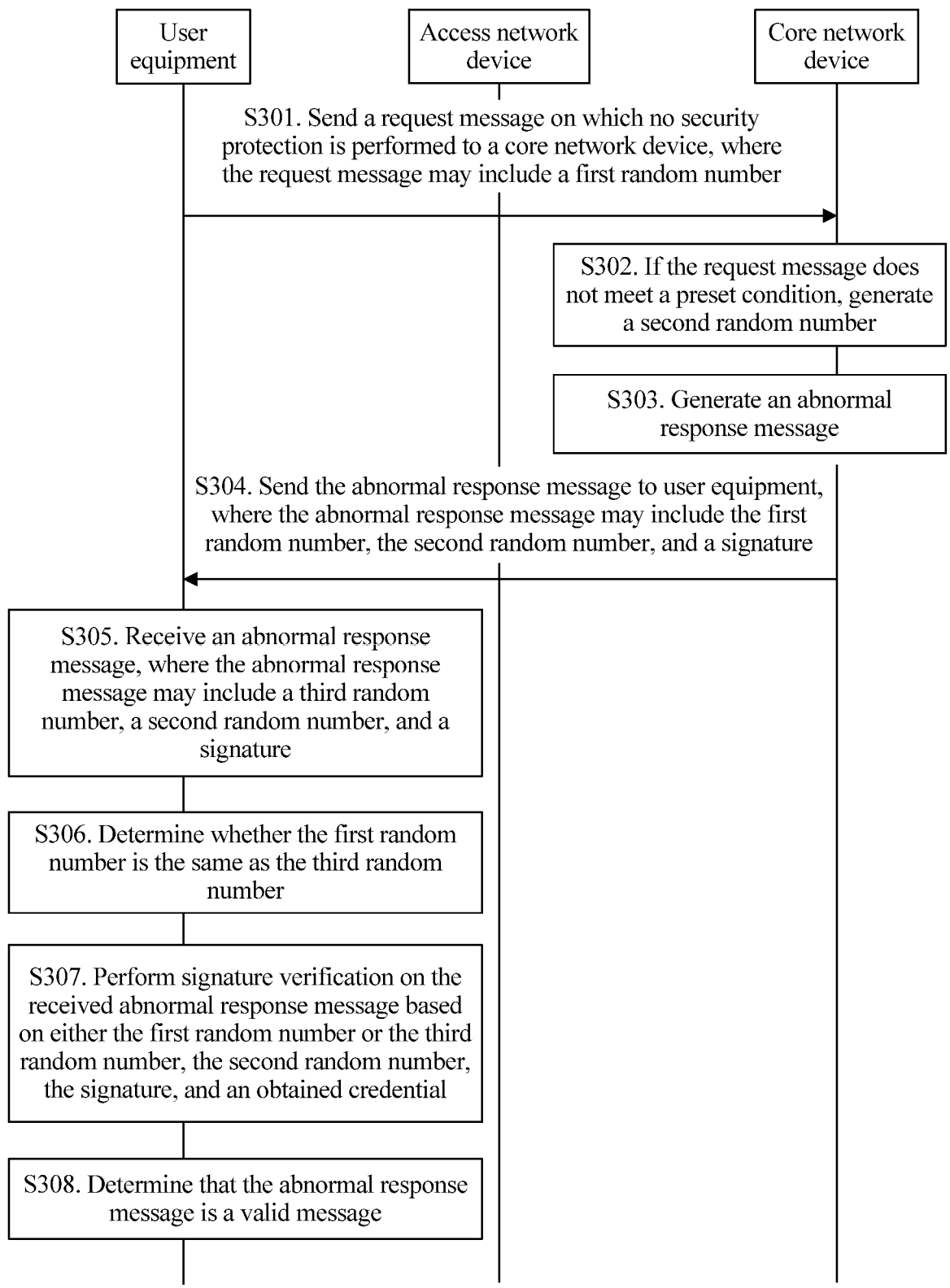
FIG. 6 is a message exchange diagram of Embodiment 3 of a message protection method according to an embodiment of the disclosure.

FIG. 6 is a message exchange diagram of Embodiment 3 of a message protection method according to an embodiment of the disclosure. Based on Embodiment 1, this embodiment of the disclosure provides another implementation of S102 and another implementation of S105. S102 may include S302 and S303, and S105 may include S306 to S308. As shown in FIG. 6, the message protection method provided in this embodiment of the disclosure may include the following operations.

Operation S301. User equipment sends a request message on which no security protection is performed to a core network device, where the request message may include a first random number.

For this operation, refer to the description in S101. A principle is similar, and details are not described herein again.

Operation S302. If determining that the request message does not meet a preset condition, the core network device generates a second random number.

A principle of the second random number is similar to that of the first random number, and details are not described herein again.

Operation S303. The core network device generates an abnormal response message.

The abnormal response message may include the first random number, the second random number, and a signature, and the signature is generated for the abnormal response message based on a pre-obtained key, the first random number, and the second random number.

For a specific implementation and an obtaining manner of the pre-obtained key, refer to the description in S102. In this case, an input parameter for generating the signature further includes the second random number based on S202.

In one embodiment, the abnormal response message may further include a credential, and the credential is used by the user equipment to verify the signature. For the credential, refer to the description in S102.

Operation S304. The core network device sends the abnormal response message to the user equipment, where the abnormal response message may include the first random number, the second random number, and a signature.

Operation S305. The user equipment receives an abnormal response message, where the abnormal response message may include a third random number, a second random number, and a signature.

The second random number is generated by the core network device.

For this step, refer to the description in S104. A principle is similar, and details are not described herein again.

Operation S306. The user equipment determines whether the first random number is the same as the third random number.

If the first random number is the same as the third random number, a next step is performed. If the first random number is different from the third random number, it is determined that the received abnormal response message is an invalid message.

Operation S307. The user equipment performs signature verification on the received abnormal response message based on either the first random number or the third random number, the second random number, the signature, and an obtained credential.

If the signature verification succeeds, a next operation is performed. If the signature verification fails, it is determined that the received abnormal response message is an invalid message.

For an obtaining manner of the credential, refer to the description in S206. In this case, an input parameter for verifying the signature further includes the second random number based on S206.

Operation S308. The user equipment determines that the received abnormal response message is a valid message.

In this embodiment of the disclosure, the input parameter used by the core network device to generate the signature includes the first random number, the second random number, and the pre-obtained key. The first random number is generated and sent by the user equipment to the core network device. The second random number is generated by the core network device. The generated signature varies as long as one of the first random number, the second random number, and the pre-obtained key varies. Therefore, by using the first random number, the second random number, and the signature, security protection can be performed on a message transmitted before a security context is established between the user equipment and the core network device.

Compared with the example shown in FIG. 5, in the message protection method provided in this embodiment of the disclosure, the second random number generated by the core network device is added to the input parameter for generating the signature. Correspondingly, the user equipment performs signature verification additionally based on the second random number, so that a verification condition is more secure, thereby improving network communication security.

Specifically, for the forgery attack scenario shown in FIG. 1, regardless of whether the pseudo base station forges the first random number, the pseudo base station cannot obtain a valid signature key, and because of the signature, the user equipment can identify an abnormal response message forged in this scenario. For the replay attack scenario shown in FIG. 2, because first random numbers included in two request messages consecutively sent by the UE are definitely different, and two second random numbers consecutively generated by the core network device are definitely different, two signatures consecutively generated by the core network device are definitely different. In this way, the user equipment can identify an abnormal response message replayed in this scenario.

It should be noted that a sequence of performing S306 and S307 is not limited in this embodiment of the disclosure.

In one embodiment, in another example, S105 in which the user equipment determines, based on the third random number, the signature, and an obtained credential, whether the abnormal response message is a valid message may include:

The user equipment performs signature verification on the received abnormal response message based on either the first random number or the third random number, the second random number, and the obtained credential;

if the signature verification succeeds, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In the message protection method provided in this embodiment of the disclosure, the input parameter used by the core network device to generate the signature includes the first random number sent by the user equipment, the second random number generated by the core network device, and the pre-obtained key; and the user equipment may perform signature verification on the received abnormal response message based on the first random number, the second random number, the third random number, the received signature, and the obtained credential, to determine whether the received abnormal response message is a valid message. According to the message protection method provided in this embodiment of the disclosure, long-time denial of service of the user equipment that is caused by a forgery attack or a replay attack made by a pseudo base station can be avoided by using the first random number, the second random number, the third random number, and the signature, so as to improve network communication security.

Figure 7:
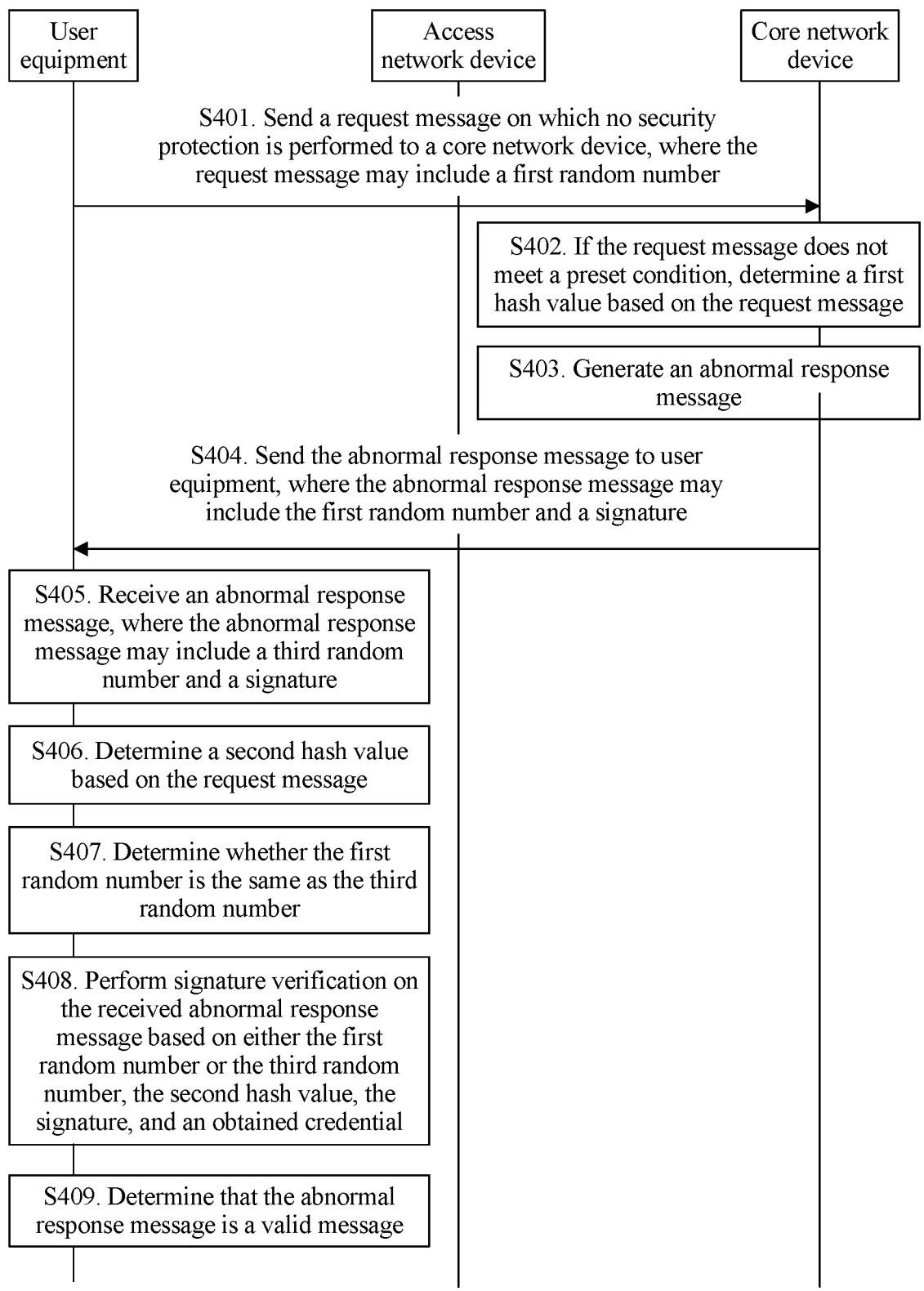
FIG. 7 is a message exchange diagram of Embodiment 4 of a message protection method according to an embodiment of the disclosure.

FIG. 7 is a message exchange diagram of Embodiment 4 of a message protection method according to an embodiment of the disclosure. Based on Embodiment 1, this embodiment of the disclosure provides still another implementation of S102 and still another implementation of S105. S102 may include S402 and S403, and S105 may include S408 to S410. As shown in FIG. 7, the message protection method provided in this embodiment of the disclosure may include the following operations.

Operation S401. User equipment sends a request message on which no security protection is performed to a core network device, where the request message may include a first random number.

For this operation, refer to the description in S101. A principle is similar, and details are not described herein again.

Operation S402. If determining that the request message does not meet a preset condition, the core network device determines a first hash value based on the received request message.

The first hash value may be determined based on the request message by using any one of existing hash algorithms. The user equipment and the core network device use a same hash algorithm. In one embodiment, if the request message (message) includes request information (message 1) and a first random value (S1), in an example, the first hash value may be determined based on a formula Hm=HASH (message); and in another example, the first hash value may be determined based on a formula Hm=HASH(message 1, S1), where Hm is a determined hash value, HASH is a hash algorithm such as SHA1, SHA128, or MD5, and the hash algorithm is the same as an algorithm used by the user equipment.

It may be understood that the first hash value varies with the request message.

Operation S403. The core network device generates an abnormal response message.

The abnormal response message may include the first random number and a signature. The signature is generated for the abnormal response message based on a pre-obtained key, the first random number, and the first hash value.

For a specific implementation and an obtaining manner of the pre-obtained key, refer to the description in S102. In this case, an input parameter for generating the signature further includes the first hash value based on S202.

In one embodiment, the abnormal response message may further include a credential, and the credential is used by the user equipment to verify the signature. For the credential, refer to the description in S102.

Operation S404. The core network device sends the abnormal response message to the user equipment, where the abnormal response message may include the first random number and a signature.

Operation S405. The user equipment receives an abnormal response message, where the abnormal response message may include a third random number and a signature.

For this operation, refer to the description in S104. A principle is similar, and details are not described herein again.

Operation S406. The user equipment determines a second hash value based on the request message.

A principle of the second hash value is similar to that of the first hash value, and details are not described herein again.

Specifically, the first hash value is determined by the core network device based on the request message, and the second hash value is determined by the user equipment based on the request message. If the request message sent by the user equipment and the request message received by the core network device do not change in a transmission process, the first hash value is the same as the second hash value.

It should be noted that S406 may be performed before S405. In this case, a user saves the second hash value for a period of time, to wait to verify the first hash value.

Operation S407. The user equipment determines whether the first random number is the same as the third random number.

If the first random number is the same as the third random number, a next operation is performed. If the first random number is different from the third random number, it is determined that the received abnormal response message is an invalid message.

Operation S408. The user equipment performs signature verification on the received abnormal response message based on either the first random number or the third random number, the second hash value, the signature, and an obtained credential.

Specifically, because the first hash value is the same as the second hash value, the user equipment may perform signature verification on the abnormal response message based on the second hash value generated by the user equipment.

If the signature verification succeeds, a next operation is performed. If the signature verification fails, it is determined that the received abnormal response message is an invalid message.

For an obtaining manner of the credential, refer to the description in S206. In this case, an input parameter for verifying the signature further includes the second hash value based on S206.

Operation S409. The user equipment determines that the received abnormal response message is a valid message.

In this embodiment of the disclosure, the input parameter used by the core network device to generate the signature includes the first random number, the first hash value, and the pre-obtained key. The first random number is generated and sent by the user equipment to the core network device. The first hash value is generated by the core network device. The generated signature varies as long as one of the first random number, the first hash value, and the pre-obtained key varies. The core network device does not send the first hash value to the user equipment. In this case, the user equipment performs signature verification on the abnormal response message based on the first random number and the second hash value. Therefore, by using the first random number, the first hash value, the second hash value, and the signature, security protection can be performed on a message transmitted before a security context is established between the user equipment and the core network device.

Compared with the example shown in FIG. 5, in the message protection method provided in this embodiment of the disclosure, the first hash value obtained by the core network device based on the request message is added to the input parameter used by the core network device to generate the signature. Correspondingly, the user equipment performs signature verification additionally based on the second hash value is added, so that a verification condition is more secure, thereby improving network communication security.

Figure 8:
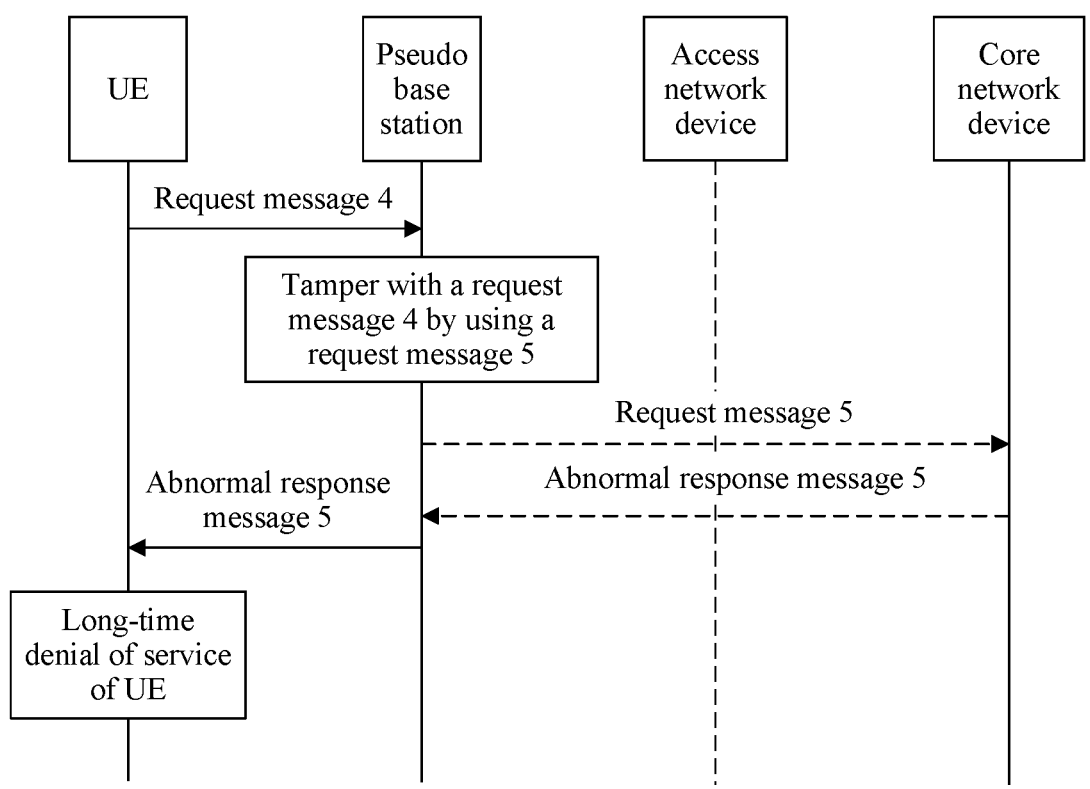
FIG. 8 is a message exchange diagram of an existing tampering attack.

It should be noted that according to the message protection method provided in this embodiment of the disclosure, a tampering attack made by a pseudo base station can be further avoided. FIG. 8 is a message exchange diagram of an existing tampering attack. As shown in FIG. 8, the UE sends a request message 4 on which no security protection is performed. After intercepting the request message 4, the pseudo base station tampers with the request message 4 by using a request message 5, and sends the request message 5 to a core network device. The request message 5 is rejected by the core network. In this case, the core network device returns an abnormal response message 5. The pseudo base station forwards the abnormal response message 5 to the UE, causing long-time denial of service of the UE.

For the tampering attack scenario shown in FIG. 8, according to the message protection method provided in this embodiment of the disclosure, the input parameter used by the core network device to generate the signature includes the first hash value determined by the core network device based on the request message, and if the request message is tampered with, the second hash value generated by the user equipment is different from the first hash value determined by the core network device. In this way, after the user equipment receives the abnormal response message, signature verification performed on the abnormal response message based on the second hash value fails. Therefore, the user equipment can determine, by using the first hash value and the second hash value, whether the received abnormal response message is a valid message, so as to avoid a tampering attack.

It should be noted that a sequence of performing S407 and S408 is not limited in this embodiment of the disclosure.

In one embodiment, in another example, S105 in which the user equipment determines, based on the third random number, the signature, and an obtained credential, whether the abnormal response message is a valid message may include:

The user equipment performs signature verification on the received abnormal response message based on either the first random number or the third random number, the second hash value, and the obtained credential;

if the signature verification succeeds, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In the message protection method provided in this embodiment of the disclosure, the input parameter used by the core network device to generate the signature includes the first random number sent by the user equipment, the first hash value determined by the core network device based on the request message, and the pre-obtained key; and the user equipment may perform signature verification on the received abnormal response message based on the first random number, the second hash value determined based on the request message, the received third random number, the received signature, and the obtained credential, to determine whether the received abnormal response message is a valid message. According to the message protection method provided in this embodiment of the disclosure, long-time denial of service of the user equipment that is caused by a forgery, replay, or tampering attack made by a pseudo base station can be avoided by using the first random number, the third random number, the first hash value, the second hash value, and the signature, so as to improve network communication security.

Figure 9:
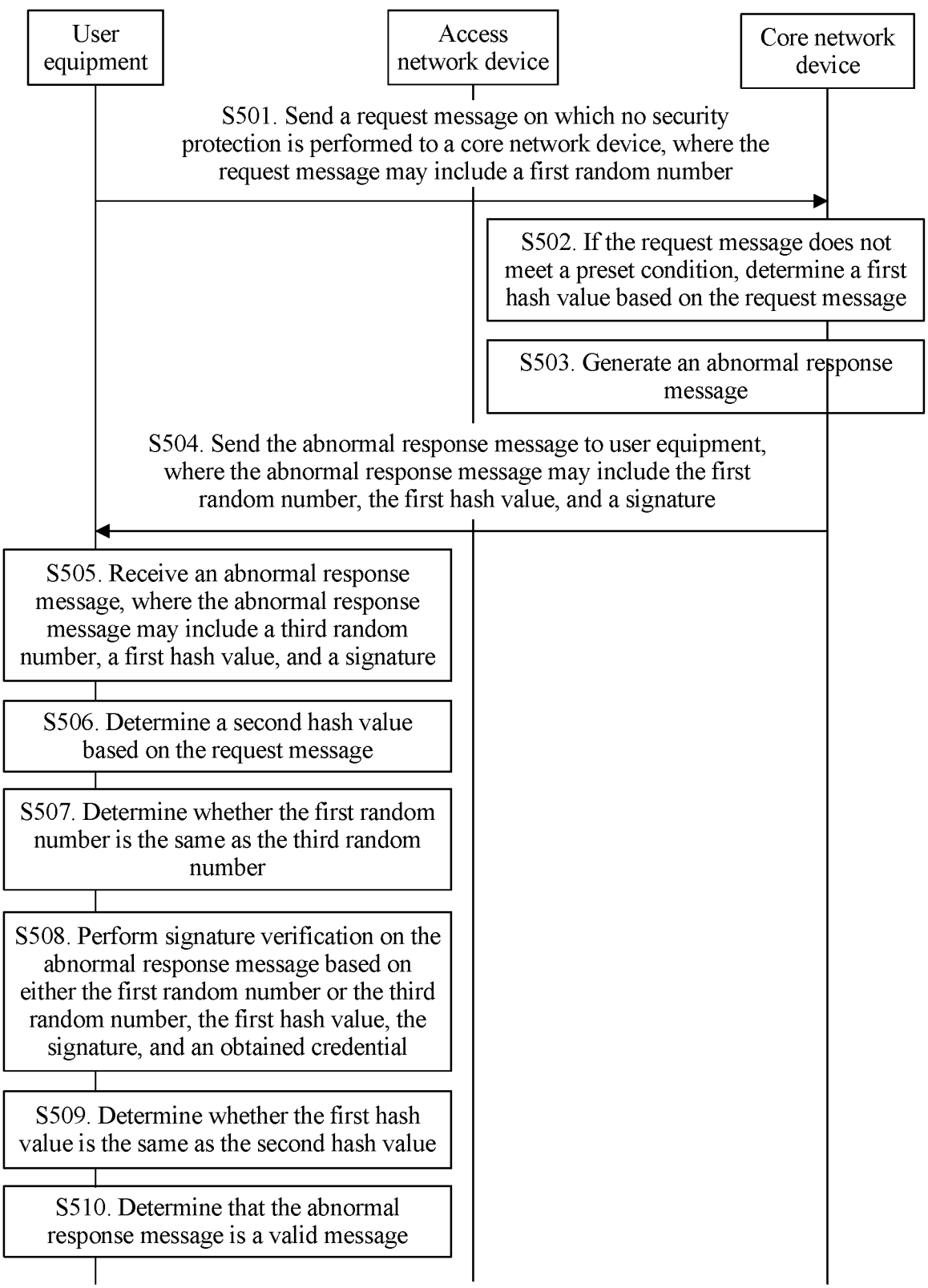
FIG. 9 is a message exchange diagram of Embodiment 5 of a message protection method according to an embodiment of the disclosure.

FIG. 9 is a message exchange diagram of Embodiment 5 of a message protection method according to an embodiment of the disclosure. Based on Embodiment 1, this embodiment of the disclosure provides still another implementation of S102 and still another implementation of S105. S102 may include S502 and S503, and S105 may include S507 to S510. As shown in FIG. 9, the message protection method provided in this embodiment of the disclosure may include the following operations.

Operation S501. User equipment sends a request message on which no security protection is performed to a core network device, where the request message may include a first random number.

For this operation, refer to the description in S101. A principle is similar, and details are not described herein again.

Operation S502. If determining that the request message does not meet a preset condition, the core network device determines a first hash value based on the received request message.

For this operation, refer to the description in S402. A principle is similar, and details are not described herein again.

Operation S503. The core network device generates an abnormal response message.

The abnormal response message may include the first random number, the first hash value, and a signature. The signature is generated for the abnormal response message based on a pre-obtained key, the first random number, and the first hash value.

For a specific implementation and an obtaining manner of the pre-obtained key, refer to the description in S102. In this case, an input parameter for generating the signature further includes the first hash value based on S202.

In one embodiment, the abnormal response message may further include a credential, and the credential is used by the user equipment to verify the signature. For the credential, refer to the description in S102.

Operation S504. The core network device sends the abnormal response message to the user equipment, where the abnormal response message may include the first random number, the first hash value, and a signature.

Operation S505. The user equipment receives an abnormal response message, where the abnormal response message may include a third random number, a first hash value, and a signature, and the first hash value is determined by the core network device based on the request message.

For this operation, refer to the description in S104. A principle is similar, and details are not described herein again.

Operation S506. The user equipment determines a second hash value based on the request message.

For this operation, refer to the description in S406. Details are not described herein again.

It should be noted that S506 may be performed before S505.

Operation S507. The user equipment determines whether the first random number is the same as the third random number.

If the first random number is the same as the third random number, a next operation is performed. If the first random number is different from the third random number, it is determined that the received abnormal response message is an invalid message.

Operation S508. The user equipment performs signature verification on the abnormal response message based on either the first random number or the third random number, the first hash value, the signature, and an obtained credential.

If the signature verification succeeds, a next operation is performed. If the signature verification fails, it is determined that the received abnormal response message is an invalid message.

For an obtaining manner of the credential, refer to the description in S206. In this case, an input parameter for verifying the signature further includes the first hash value based on S206.

Operation S509. The user equipment determines whether the first hash value is the same as the second hash value.

If the first hash value is the same as the second hash value, a next operation is performed. If the first hash value is different from the second hash value, it is determined that the received abnormal response message is an invalid message.

Operation S510. The user equipment determines that the received abnormal response message is a valid message.

Compared with the example shown in FIG. 7, in the message protection method provided in this embodiment of the disclosure, the abnormal response message sent by the core network device to the user equipment further includes the first hash value, and the user equipment may determine whether the first hash value is the same as the second hash value, to determine whether the received abnormal response message is a valid message, so as to avoid an attack, and improve network communication security.

It should be noted that a sequence of performing S507 to S509 is not limited in this embodiment of the disclosure.

In one embodiment, in another example, S105 in which the user equipment determines, based on the third random number, the signature, and an obtained credential, whether the abnormal response message is a valid message may include:

The user equipment determines whether the first random number is the same as the third random number;

if the first random number is the same as the third random number, the user equipment determines whether the first hash value is the same as the second hash value;

if the first hash value is the same as the second hash value, the user equipment performs signature verification on the abnormal response message based on either the first random number or the third random number, either the first hash value or the second hash value, and the obtained credential; and if the signature verification succeeds, the user equipment determines that the received abnormal response message is a valid message; or if the verification fails, the user equipment determines that the received abnormal response message is an invalid message.

In one embodiment, in still another example, S105 in which the user equipment determines, based on the third random number, the signature, and an obtained credential, whether the abnormal response message is a valid message may include:

The user equipment performs signature verification on the abnormal response message based on either the first random number or the third random number, the first hash value, and the obtained credential;

if the signature verification succeeds, the user equipment determines whether the first random number is the same as the third random number;

if the first random number is the same as the third random number, the user equipment determines whether the first hash value is the same as the second hash value; and if the first hash value is the same as the second hash value, the user equipment determines that the received abnormal response message is a valid message; or if any verification described above fails, the user equipment determines that the received abnormal response message is an invalid message.

In one embodiment, in still another example, S105 in which the user equipment determines, based on the third random number, the signature, and an obtained credential, whether the abnormal response message is a valid message may include:

The user equipment performs signature verification on the abnormal response message based on either the first random number or the third random number, the first hash value, and the obtained credential;

if the signature verification succeeds, the user equipment determines whether the first hash value is the same as the second hash value;

if the first hash value is the same as the second hash value, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In one embodiment, in still another example, S105 in which the user equipment determines, based on the third random number and the signature, whether the abnormal response message is a valid message may include:

The user equipment determines whether the first hash value is the same as the second hash value;

if the first hash value is the same as the second hash value, the user equipment determines whether the first random number is the same as the third random number;

if the first random number is the same as the third random number, the user equipment performs signature verification on the abnormal response message based on either the first random number or the third random number, either the first hash value or the second hash value, and the obtained credential; and if the signature verification succeeds, the user equipment determines that the received abnormal response message is a valid message; or if any verification described above fails, the user equipment determines that the received abnormal response message is an invalid message.

In one embodiment, in still another example, S105 in which the user equipment determines, based on the third random number, the signature, and an obtained credential, whether the abnormal response message is a valid message may include:

The user equipment determines whether the first hash value is the same as the second hash value;

if the first hash value is the same as the second hash value, the user equipment performs signature verification on the abnormal response message based on either the first random number or the third random number, either the first hash value or the second hash value, and the obtained credential;

if the signature verification succeeds, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In the message protection method provided in this embodiment of the disclosure, the input parameter used by the core network device to generate the signature includes the first random number sent by the user equipment, the first hash value determined by the core network device based on the request message, and the pre-obtained key; the core network device sends the first hash value to the user equipment; and the user equipment may perform signature verification on the received abnormal response message based on the first random number, the third random number, the first hash value, the received signature, and the obtained credential, to determine whether the received abnormal response message is a valid message. According to the message protection method provided in this embodiment of the disclosure, long-time denial of service of the user equipment that is caused by a forgery, replay, or tampering attack made by a pseudo base station can be avoided by using the first random number, the third random number, the first hash value, the second hash value, and the signature, so as to improve network communication security.

Figure 10:
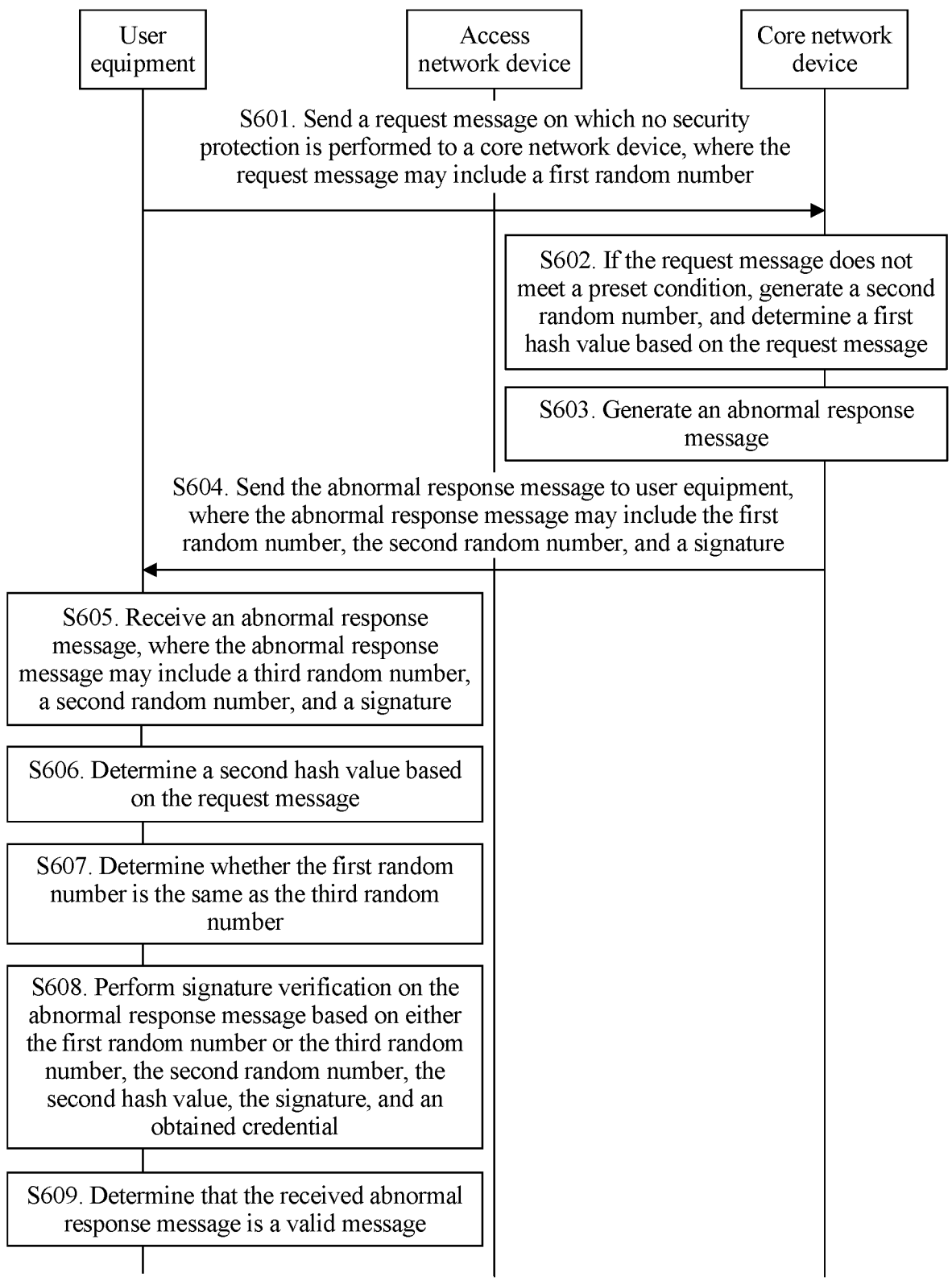
FIG. 10 is a message exchange diagram of Embodiment 6 of a message protection method according to an embodiment of the disclosure.

FIG. 10 is a message exchange diagram of Embodiment 6 of a message protection method according to an embodiment of the disclosure. Based on Embodiment 1, this embodiment of the disclosure provides still another implementation of S102 and still another implementation of S105.

S102 may include S602 and S603, and S105 may include S607 to S609. As shown in FIG. 10, the message protection method provided in this embodiment of the disclosure may include the following operations.

Operation S601. User equipment sends a request message on which no security protection is performed to a core network device, where the request message may include a first random number.

For this operation, refer to the description in S101. A principle is similar, and details are not described herein again.

Operation S602. If determining that the request message does not meet a preset condition, the core network device generates a second random number, and determines a first hash value based on the received request message.

A sequence of generating the second random number and determining the first hash value based on the received request message is not limited in this embodiment of the disclosure.

A principle of the second random number is similar to that of the first random number, and details are not described herein again.

For determining of the first hash value based on the received request message, refer to the description in S402. A principle is similar, and details are not described herein again.

Operation S603. The core network device generates an abnormal response message.

The abnormal response message may include the first random number, the second random number, and a signature. The signature is generated for the abnormal response message based on a pre-obtained key, the first random number, the second random number, and the first hash value.

For a specific implementation and an obtaining manner of the pre-obtained key, refer to the description in S102. In this case, an input parameter for generating the signature further includes the second random number and the first hash value based on S202.

In one embodiment, the abnormal response message may further include a credential, and the credential is used by the user equipment to verify the signature. For the credential, refer to the description in S102.

Operation S604. The core network device sends the abnormal response message to the user equipment, where the abnormal response message may include the first random number, the second random number, and a signature.

Operation S605. The user equipment receives an abnormal response message, where the abnormal response message may include a third random number, a second random number, and a signature, and the second random number is generated by the core network device.

For this operation, refer to the description in S104. A principle is similar, and details are not described herein again.

Operation S606. The user equipment determines a second hash value based on the request message.

For this operation, refer to the description in S406. Details are not described herein again.

It should be noted that S606 may be performed before S605.

Operation S607. The user equipment determines whether the first random number is the same as the third random number.

If the first random number is the same as the third random number, a next operation is performed. If the first random number is different from the third random number, it is determined that the received abnormal response message is an invalid message.

Operation S608. The user equipment performs signature verification on the abnormal response message based on either the first random number or the third random number, the second random number, the second hash value, the signature, and an obtained credential.

If the signature verification succeeds, a next operation is performed. If the signature verification fails, it is determined that the received abnormal response message is an invalid message.

For an obtaining manner of the credential, refer to the description in S206. In this case, an input parameter for verifying the signature further includes the second random number and the second hash value based on S206.

Operation S609. The user equipment determines that the received abnormal response message is a valid message.

Compared with the example shown in FIG. 7, in the message protection method provided in this embodiment of the disclosure, the input parameter used by the core network device to generate the signature further includes the second random number generated by the core network device, and therefore a signature generation condition is increased. Correspondingly, the user equipment determines, based on the first random number, the second random number, the third random number, the second hash value, and the signature, whether the received abnormal response message is a valid message. Therefore, a condition used by the user equipment to verify the signature is more secure, so as to improve network communication security.

It should be noted that a sequence of performing S607 and S608 is not limited in this embodiment of the disclosure.

In one embodiment, in another example, S105 in which the user equipment determines, based on the third random number, the signature, and an obtained credential, whether the abnormal response message is a valid message may include:

The user equipment performs signature verification on the abnormal response message based on either the first random number or the third random number, the second random number, the second hash value, and the obtained credential;

if the signature verification succeeds, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In the message protection method provided in this embodiment of the disclosure, the input parameter used by the core network device to generate the signature includes the first random number sent by the user equipment, the second random number generated by the core network device, the first hash value determined by the core network device based on the request message, and the pre-obtained key; and the user equipment may perform signature verification on the received abnormal response message based on the first random number, the second random number, the third random number, the second hash value, the received signature, and the obtained credential, to determine whether the received abnormal response message is a valid message. According to the message protection method provided in this embodiment of the disclosure, long-time denial of service of the user equipment that is caused by a forgery, replay, or tampering attack made by a pseudo base station can be avoided by using the first random number, the second random number, the third random number, the first hash value, the second hash value, and the signature, so as to improve network communication security.

Figure 11A:
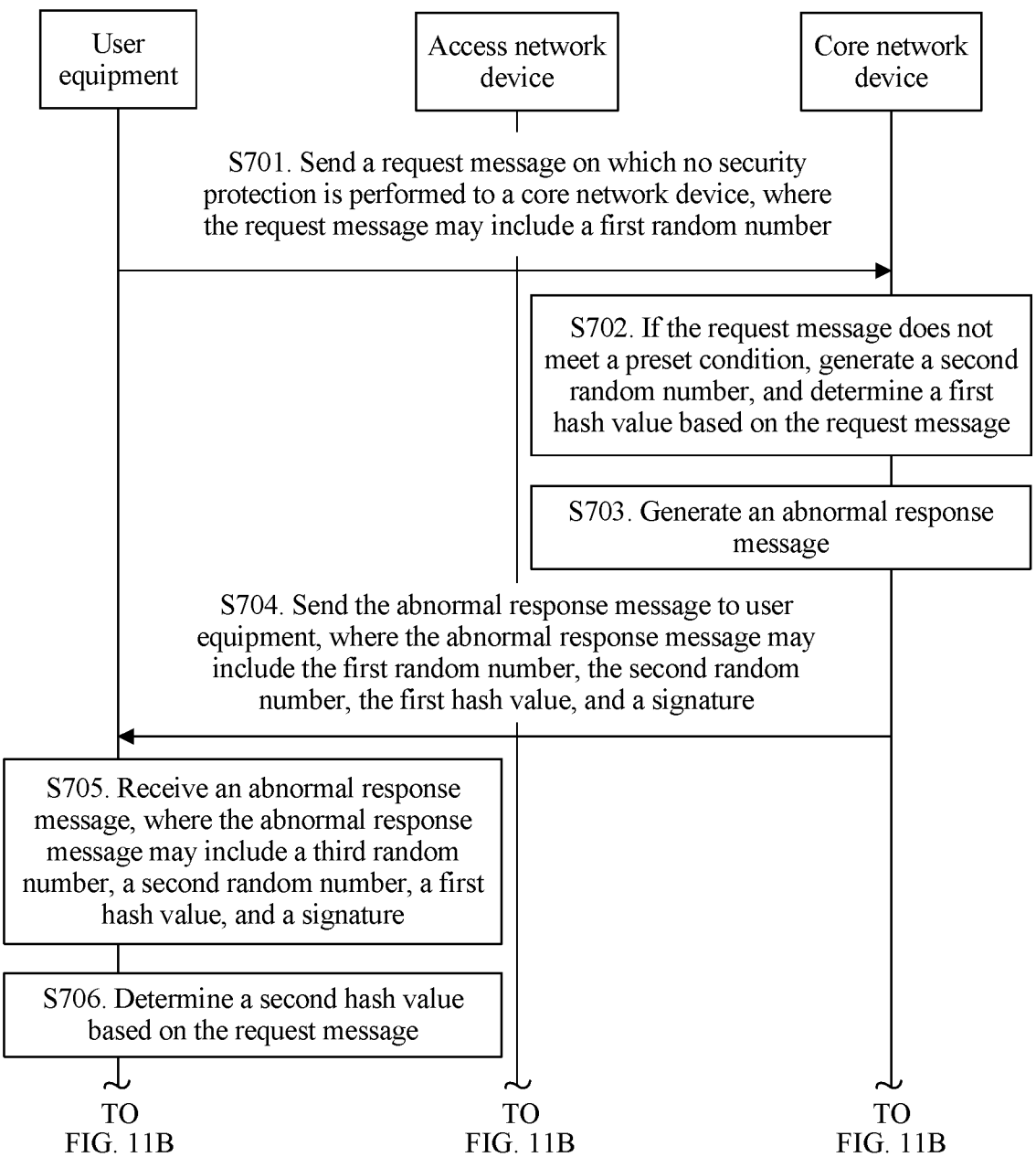
FIG. 11A and FIG. 11B are a message exchange diagram of Embodiment 7 of a message protection method according to an embodiment of the disclosure.
Figure 11B:
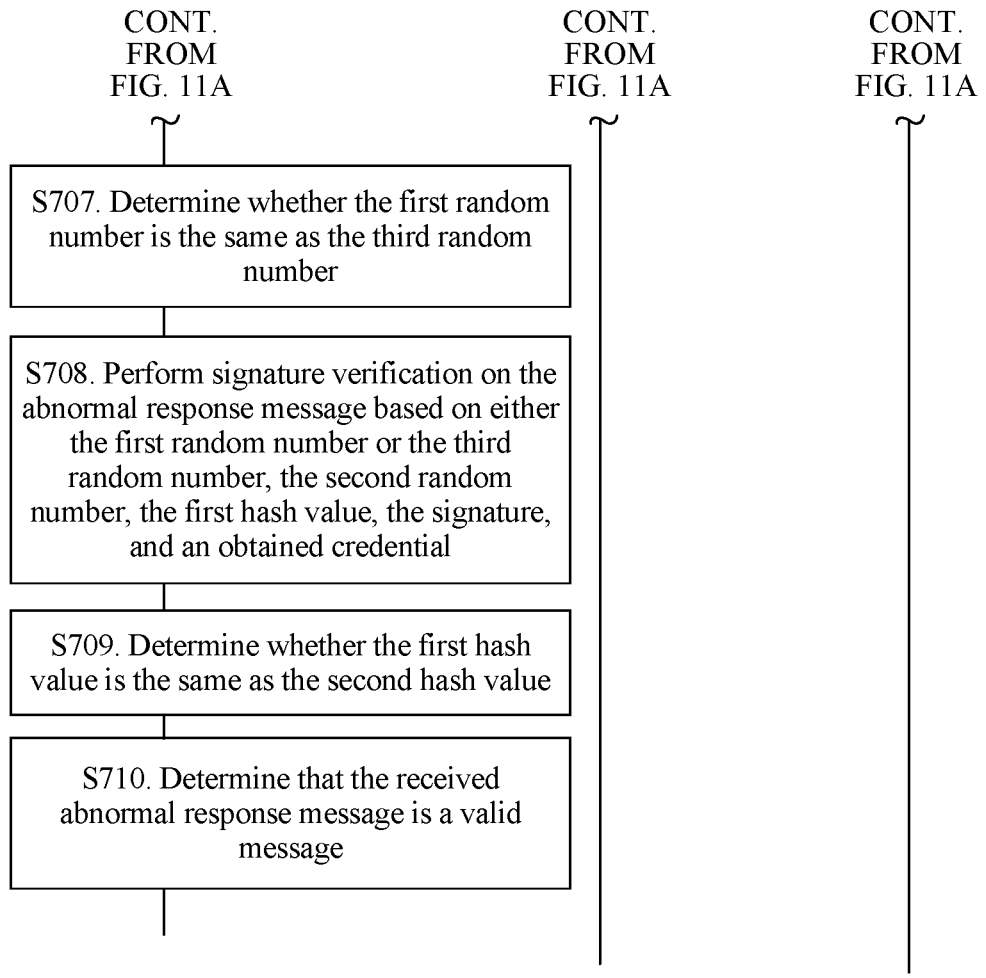

FIG. 11A and FIG. 11B are a message exchange diagram of Embodiment 7 of a message protection method according to an embodiment of the disclosure. Based on Embodiment 1, this embodiment of the disclosure provides still another implementation of S102 and still another implementation of S105. S102 may include S702 and S703, and S105 may include S707 to S710. As shown in FIG. 11A and FIG. 11B, the message protection method provided in this embodiment of the disclosure may include the following operations.

Operation S701. User equipment sends a request message on which no security protection is performed to a core network device, where the request message may include a first random number.

For this operation, refer to the description in S101. A principle is similar, and details are not described herein again.

Operation S702. If determining that the request message does not meet a preset condition, the core network device generates a second random number, and determines a first hash value based on the received request message.

A sequence of generating the second random number and determining the first hash value based on the received request message is not limited in this embodiment of the disclosure.

A principle of the second random number is similar to that of the first random number, and details are not described herein again.

For determining of the first hash value based on the received request message, refer to the description in S402. A principle is similar, and details are not described herein again.

Operation S703. The core network device generates an abnormal response message.

The abnormal response message may include the first random number, the second random number, the first hash value, and a signature. The signature is generated for the abnormal response message based on a pre-obtained key, the first random number, the second random number, and the first hash value.

For a specific implementation and an obtaining manner of the pre-obtained key, refer to the description in S102. In this case, an input parameter for generating the signature further includes the second random number and the first hash value based on S202.

In one embodiment, the abnormal response message may further include a credential, and the credential is used by the user equipment to verify the signature. For the credential, refer to the description in S102.

Operation S704. The core network device sends the abnormal response message to the user equipment, where the abnormal response message may include the first random number, the second random number, the first hash value, and a signature.

Operation S705. The user equipment receives an abnormal response message, where the abnormal response message may include a third random number, a second random number, a first hash value, and a signature, the first hash value is determined by the core network device based on the request message, and the second random number is generated by the core network device.

For this operation, refer to the description in S104. A principle is similar, and details are not described herein again.

Operation S706. The user equipment determines a second hash value based on the request message.

For this operation, refer to the description in S406. Details are not described herein again.

It should be noted that S706 may be performed before S705.

Operation S707. The user equipment determines whether the first random number is the same as the third random number.

If the first random number is the same as the third random number, a next operation is performed. If the first random number is different from the third random number, it is determined that the received abnormal response message is an invalid message.

Operation S708. The user equipment performs signature verification on the abnormal response message based on either the first random number or the third random number, the second random number, the first hash value, the signature, and an obtained credential.

If the signature verification succeeds, a next operation is performed. If the signature verification fails, it is determined that the received abnormal response message is an invalid message.

For an obtaining manner of the credential, refer to the description in S206. In this case, an input parameter for verifying the signature further includes the second random number and the first hash value based on S206.

Operation S709. The user equipment determines whether the first hash value is the same as the second hash value.

If the first hash value is the same as the second hash value, a next operation is performed. If the first hash value is different from the second hash value, it is determined that the received abnormal response message is an invalid message.

Operation S710. The user equipment determines that the received abnormal response message is a valid message.

Compared with the example shown in FIG. 10, in the message protection method provided in this embodiment of the disclosure, the abnormal response message sent by the core network device to the user equipment includes the first hash value, and the abnormal response message received by the user equipment includes the first hash value. It may be understood that the first hash value sent by the core network device may be the same as or different from the first hash value received by the user equipment. Therefore, the user equipment may determine whether the first hash value is the same as the second hash value, to determine whether the received abnormal response message is a valid message, so as to avoid an attack, and improve network communication security.

Compared with the example shown in FIG. 9, in the message protection method provided in this embodiment of the disclosure, the input parameter used by the core network device to generate the signature further includes the second random number generated by the core network device, and therefore a signature generation condition is strengthened. Correspondingly, the user equipment determines, based on the first random number, the second random number, the third random number, the second hash value, and the signature, whether the received abnormal response message is a valid message. Therefore, a condition used by the user equipment to verify the signature is more secure, so as to improve network communication security.

It should be noted that a sequence of performing S707 to S709 is not limited in this embodiment of the disclosure.

In one embodiment, in another example, S105 in which the user equipment determines, based on the third random number, the signature, and an obtained credential, whether the abnormal response message is a valid message may include:

The user equipment determines whether the first random number is the same as the third random number;

if the first random number is the same as the third random number, the user equipment determines whether the first hash value is the same as the second hash value;

if the first hash value is the same as the second hash value, the user equipment performs signature verification on the abnormal response message based on either the first random number or the third random number, the second random number, either the first hash value or the second hash value, and the obtained credential; and if the signature verification succeeds, the user equipment determines that the received abnormal response message is a valid message; or if any verification described above fails, the user equipment determines that the received abnormal response message is an invalid message.

In one embodiment, in still another example, S105 in which the user equipment determines, based on the third random number, the signature, and an obtained credential, whether the abnormal response message is a valid message may include:

The user equipment performs signature verification on the abnormal response message based on either the first random number or the third random number, the second random number, the first hash value, and the obtained credential;

if the signature verification succeeds, the user equipment determines whether the first random number is the same as the third random number.

if the first random number is the same as the third random number, the user equipment determines whether the first hash value is the same as the second hash value; and if the first hash value is the same as the second hash value, the user equipment determines that the received abnormal response message is a valid message; or if any verification described above fails, the user equipment determines that the received abnormal response message is an invalid message.

In one embodiment, in still another example, S105 in which the user equipment determines, based on the third random number, the signature, and an obtained credential, whether the abnormal response message is a valid message may include:

The user equipment performs signature verification on the abnormal response message based on either the first random number or the third random number, the second random number, the first hash value, and the obtained credential;

if the signature verification succeeds, the user equipment determines whether the first hash value is the same as the second hash value;

if the first hash value is the same as the second hash value, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In one embodiment, in still another example, S105 in which the user equipment determines, based on the third random number, the signature, and an obtained credential, whether the abnormal response message is a valid message may include:

The user equipment determines whether the first hash value is the same as the second hash value;

if the first hash value is the same as the second hash value, the user equipment determines whether the first random number is the same as the third random number;

if the first random number is the same as the third random number, the user equipment performs signature verification on the abnormal response message based on either the first random number or the third random number, the second random number, either the first hash value or the second hash value, and the obtained credential; and if the signature verification succeeds, the user equipment determines that the received abnormal response message is a valid message; or if any verification described above fails, the user equipment determines that the received abnormal response message is an invalid message.

In one embodiment, in still another example, S105 in which the user equipment determines, based on the third random number, the signature, and an obtained credential, whether the abnormal response message is a valid message may include:

The user equipment determines whether the first hash value is the same as the second hash value;

if the first hash value is the same as the second hash value, the user equipment performs signature verification on the abnormal response message based on either the first random number or the third random number, the second random number, either the first hash value or the second hash value, and the obtained credential;

if the signature verification succeeds, the user equipment determines whether the first random number is the same as the third random number; and if the first random number is the same as the third random number, the user equipment determines that the received abnormal response message is a valid message; or if any verification described above fails, the user equipment determines that the received abnormal response message is an invalid message.

In the message protection method provided in this embodiment of the disclosure, the input parameter used by the core network device to generate the signature includes the first random number sent by the user equipment, the second random number generated by the core network device, the first hash value determined by the core network device based on the request message, and the pre-obtained key; the core network device sends the first hash value to the user equipment; and the user equipment may perform signature verification on the received abnormal response message based on the first random number, the second random number, the third random number, the first hash value, the second hash value, the received signature, and the obtained credential, to determine whether the received abnormal response message is a valid message. According to the message protection method provided in this embodiment of the disclosure, long-time denial of service of the user equipment that is caused by a forgery, replay, or tampering attack made by a pseudo base station can be avoided by using the first random number, the second random number, the third random number, the first hash value, the second hash value, and the signature, so as to improve network communication security.

Figure 12:
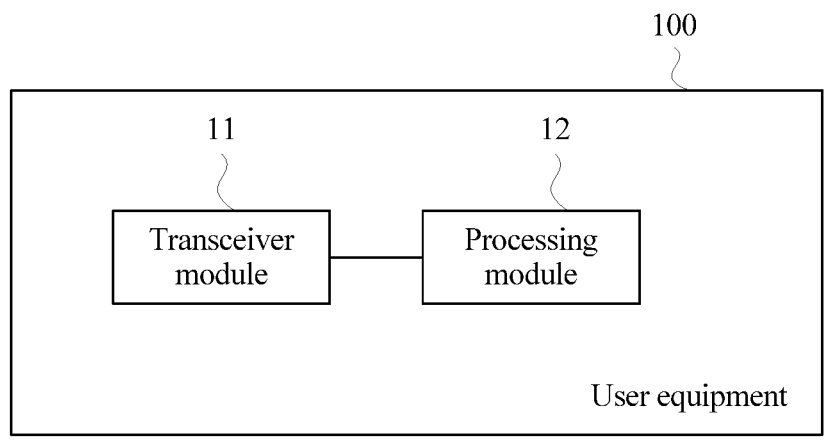
FIG. 12 is a schematic structural diagram of user equipment according to an embodiment of the disclosure.

An embodiment of the disclosure further provides user equipment. The user equipment may perform the operations performed by the user equipment in the message protection method provided in any one of the method embodiments in FIG. 4 to FIG. 7 and FIG. 9 to FIG. 11A and FIG. 11B. FIG. 12 is a schematic structural diagram of user equipment 100 according to an embodiment of the disclosure. As shown in FIG. 12, the user equipment 100 provided in this embodiment of the disclosure may include:

a transceiver module 11, configured to: send a request message on which no security protection is performed to a core network device, where the request message includes a first random number; and receive an abnormal response message, where the abnormal response message includes a third random number and a signature; and a processing module 12, configured to determine, based on the third random number, the signature, and an obtained credential, whether the abnormal response message is a valid message.

In one embodiment, the processing module 12 is specifically configured to:

if the first random number is the same as the third random number, and signature verification succeeds, determine that the abnormal response message is a valid message, where that signature verification succeeds includes: signature verification performed on the abnormal response message based on the third random number, the signature, and the credential succeeds.

In one embodiment, the abnormal response message further includes a second random number, and the processing module 12 is specifically configured to:

if the first random number is the same as the third random number, and signature verification succeeds, determine that the abnormal response message is a valid message, where that signature verification succeeds includes: signature verification performed on the abnormal response message based on the third random number, the second random number, the signature, and the credential succeeds.

In one embodiment, the processing module 12 is further configured to determine a second hash value based on the request message; and the processing module 12 is specifically configured to:

if the first random number is the same as the third random number, and signature verification succeeds, determine that the abnormal response message is a valid message, where that signature verification succeeds includes: signature verification performed on the abnormal response message based on the third random number, the second hash value, the signature, and the credential succeeds.

In one embodiment, the processing module 12 is further configured to determine a second hash value based on the request message, where the abnormal response message further includes a first hash value, and the first hash value is determined by the core network device based on the request message; and the processing module 12 is specifically configured to:

if the first random number is the same as the third random number, the first hash value is the same as the second hash value, and signature verification succeeds, determine that the abnormal response message is a valid message, where that signature verification succeeds includes: signature verification performed on the abnormal response message based on the third random number, the first hash value, the signature, and the credential succeeds.

In one embodiment, the processing module 12 is further configured to determine a second hash value based on the request message, where the abnormal response message further includes a second random number; and the processing module 12 is specifically configured to:

if the first random number is the same as the third random number, and signature verification succeeds, determine that the abnormal response message is a valid message, where that signature verification succeeds includes: signature verification performed on the abnormal response message based on the third random number, the second random number, the second hash value, the signature, and the credential succeeds.

In one embodiment, the processing module 12 is further configured to determine a second hash value based on the request message, where the abnormal response message further includes a second random number and a first hash value, and the first hash value is determined by the core network device based on the request message; and the processing module 12 is specifically configured to:

if the first random number is the same as the third random number, the first hash value is the same as the second hash value, and signature verification succeeds, determine that the abnormal response message is a valid message, where that signature verification succeeds includes: signature verification performed on the abnormal response message based on the third random number, the second random number, the first hash value, the signature, and the credential succeeds.

In one embodiment, the request message includes an attach request message or a tracking area update request message.

In one embodiment, the abnormal response message includes an attach reject message, a tracking area update reject message, or an identity request message.

In one embodiment, the abnormal response message further includes the credential, and the credential is used to verify the signature.

In one embodiment, the processing module 12 is further configured to: if determining that the abnormal response message is an invalid message, change an accessed access network device; and the transceiver module 11 is further configured to resend the request message to the core network device by using a changed access network device.

Figure 13:
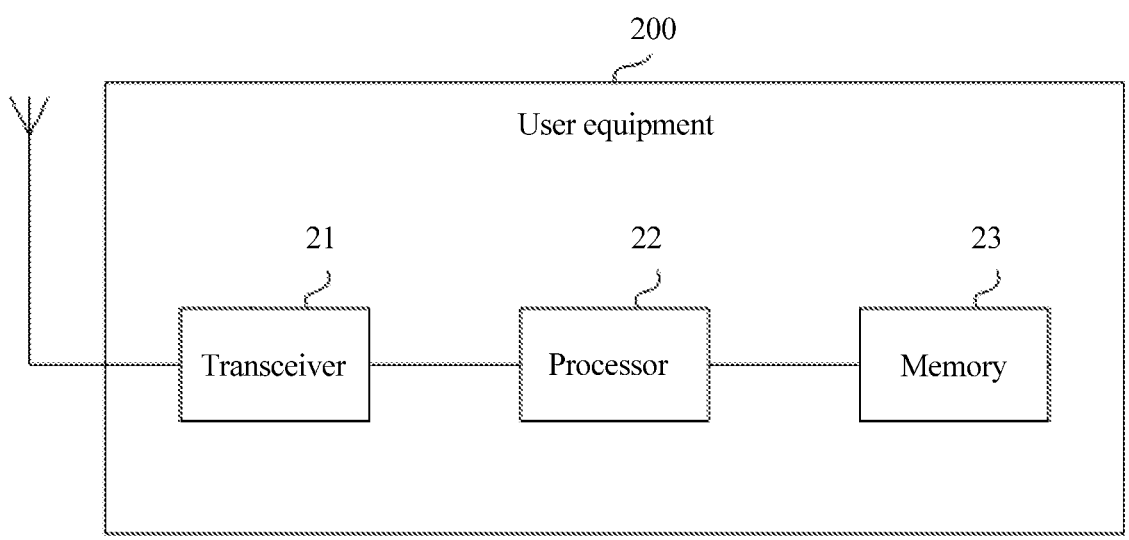
FIG. 13 is a schematic structural diagram of another user equipment according to an embodiment of the disclosure.

In one embodiment, an embodiment of the disclosure may further provide user equipment. FIG. 13 is a schematic structural diagram of another user equipment 200 according to an embodiment of the disclosure. As shown in FIG. 13, the user equipment 200 may include a processor 22, a transceiver 21, and a memory 23. The processor 22 may be connected to the transceiver 21. The processor 22 may be further connected to the memory 23.

The processor 22 may invoke a program instruction stored in the memory 23, to implement the processing module 12 shown above. The processor 22 may control the transceiver 21 to implement the transceiver module 11 shown above.

In one embodiment, an embodiment of the disclosure further provides a computer program product. The computer program product may include program code.

The program code may be program code used to perform the message protection method performed by the user equipment in any one of the method embodiments in FIG. 4 to FIG. 7 and FIG. 9 to FIG. 11A and FIG. 11B in the embodiments of the disclosure. For example, the program code in the computer program product may be executed by the processor 22 in the user equipment 200 shown in FIG. 13.

In one embodiment, an embodiment of the disclosure further provides a storage medium. The storage medium may be configured to store a computer program product. The computer program product may include program code.

The program code may be program code used to perform the message protection method performed by the user equipment in any one of the method embodiments in FIG. 4 to FIG. 7 and FIG. 9 to FIG. 11A and FIG. 11B in the embodiments of the disclosure.

The storage medium may be an internal memory in the user equipment 200 shown in FIG. 13, or may be an external memory connected to the user equipment 200 shown in FIG. 13. For example, the program code in the computer program product may be executed by the processor 22 in the user equipment 200 shown in FIG. 13.

The user equipment, the computer program product, and the storage medium provided in the embodiments of the disclosure may perform the operations performed by the user equipment in the message protection method provided in any one of the method embodiments in FIG. 4 to FIG. 7 and FIG. 9 to FIG. 11A and FIG. 11B. For specific implementation and beneficial effects thereof, refer to the foregoing descriptions. Details are not described herein again.

Figure 14:
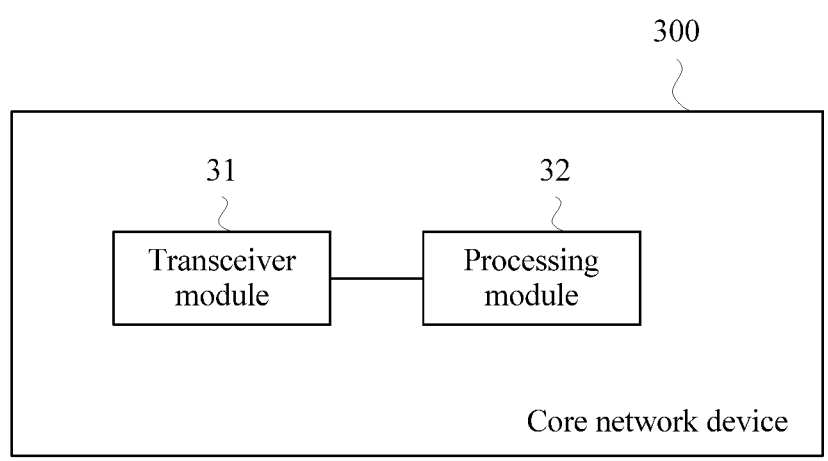
FIG. 14 is a schematic structural diagram of a core network device according to an embodiment of the disclosure.

An embodiment of the disclosure further provides a core network device. The core network device may perform the operations performed by the core network device in the message protection method provided in any one of the method embodiments in FIG. 4 to FIG. 7 and FIG. 9 to FIG. 11A and FIG. 11B. FIG. 14 is a schematic structural diagram of a core network device 300 according to an embodiment of the disclosure. As shown in FIG. 14, the core network device 300 provided in this embodiment of the disclosure may include:

a transceiver module 31, configured to: receive a request message that is sent by user equipment and on which no security protection is performed, where the request message includes a first random number; and send an abnormal response message generated by a processing module 32 to the user equipment; and the processing module 32, configured to: when the request message does not meet a preset condition, generate the abnormal response message, where the abnormal response message includes the first random number and a signature, and the signature is generated by the processing module 32 based on an input parameter including the first random number.

In one embodiment, the processing module 32 is specifically configured to generate the signature for the abnormal response message based on a pre-obtained key and the first random number.

In one embodiment, the processing module 32 is further configured to generate a second random number, where the abnormal response message further includes the second random number; and the processing module 32 is specifically configured to generate the signature for the abnormal response message based on a pre-obtained key, the first random number, and the second random number.

In one embodiment, the processing module 32 is further configured to determine a first hash value based on the request message; and the processing module 32 is specifically configured to generate the signature for the abnormal response message based on a pre-obtained key, the first random number, and the first hash value.

In one embodiment, the processing module 32 is further configured to:

generate a second random number; and determine a first hash value based on the request message, where the abnormal response message further includes the second random number; and the processing module 32 is specifically configured to generate the signature for the abnormal response message based on a pre-obtained key, the first random number, the second random number, and the first hash value.

In one embodiment, the abnormal response message further includes the first hash value.

In one embodiment, the request message includes an attach request message or a tracking area update request message.

In one embodiment, the abnormal response message includes an attach reject message, a tracking area update reject message, or an identity request message.

In one embodiment, the abnormal response message further includes a credential, and the credential is used by the user equipment to verify the signature.

Figure 15:
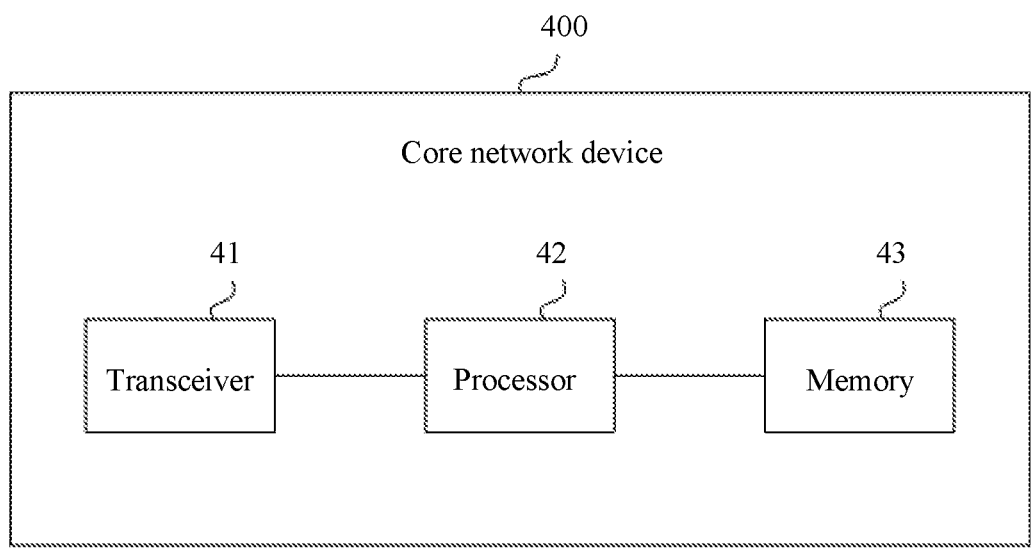
FIG. 15 is a schematic structural diagram of another core network device according to an embodiment of the disclosure.

In one embodiment, an embodiment of the disclosure may further provide a core network device. FIG. 15 is a schematic structural diagram of another core network device 400 according to an embodiment of the disclosure. As shown in FIG. 15, the core network device 400 may include a processor 42, a transceiver 41, and a memory 43. The processor 42 may be connected to the transceiver 41. The processor 42 may be further connected to the memory 43.

The processor 42 may invoke a program instruction stored in the memory 43, to implement the processing module 32 shown above. The processor 42 may control the transceiver 41 to implement the transceiver module 31 shown above.

In one embodiment, an embodiment of the disclosure further provides a computer program product. The computer program product may include program code.

The program code may be program code used to perform the message protection method performed by the core network device in any one of the method embodiments in FIG. 4 to FIG. 7 and FIG. 9 to FIG. 11A and FIG. 11B in the embodiments of the disclosure. For example, the program code in the computer program product may be executed by the processor 42 in the core network device 400 shown in FIG. 15.

In one embodiment, an embodiment of the disclosure further provides a storage medium. The storage medium may be configured to store a computer program product. The computer program product may include program code.

The program code may be program code used to perform the message protection method performed by the core network device in any one of the method embodiments in FIG. 4 to FIG. 7 and FIG. 9 to FIG. 11A and FIG. 11B in the embodiments of the disclosure.

The storage medium may be an internal memory in the core network device 400 shown in FIG. 15, or may be an external memory connected to the core network device 400 shown in FIG. 15. For example, the program code in the computer program product may be executed by the processor 42 in the core network device 400 shown in FIG. 15.

The core network device, the computer program product, and the storage medium provided in the embodiments of the disclosure may perform the operations performed by the core network device in the message protection method provided in any one of the method embodiments in FIG. 4 to FIG. 7 and FIG. 9 to FIG. 11A and FIG. 11B. For specific implementation and beneficial effects thereof, refer to the foregoing descriptions. Details are not described herein again.

What is claimed is:

1. A message protection method, comprising:
sending a request message on which no security protection is performed to a core network device, wherein the request message comprises a first random number;
receiving an abnormal response message, wherein the abnormal response message comprises a third random number and a signature; and
determining, based on the third random number, the signature, and an obtained credential, whether the abnormal response message is a valid message.

2. The method according to claim 1, wherein the determining, based on the third random number, the signature, and an obtained credential, whether the abnormal response message is a valid message comprises:
if the first random number is the same as the third random number, and signature verification succeeds, determining that the abnormal response message is a valid message, wherein that signature verification succeeds comprises: signature verification performed on the abnormal response message based on the third random number, the signature, and the credential succeeds.

3. The method according to claim 1, wherein the abnormal response message further comprises a second random number, and the determining, based on the third random number, the signature, and an obtained credential, whether the abnormal response message is a valid message comprises:
if the first random number is the same as the third random number, and signature verification succeeds, determining that the abnormal response message is a valid message, wherein that signature verification succeeds comprises: signature verification performed on the abnormal response message based on the third random number, the second random number, the signature, and the credential succeeds.

4. The method according to claim 1, wherein the method further comprises: determining a second hash value based on the request message; and
the determining, based on the third random number, the signature, and an obtained credential, whether the abnormal response message is a valid message comprises:
if the first random number is the same as the third random number, and signature verification succeeds, determining that the abnormal response message is a valid message, wherein that signature verification succeeds comprises: signature verification performed on the abnormal response message based on the third random number, the second hash value, the signature, and the credential succeeds.

5. The method according to claim 1, wherein the method further comprises: determining a second hash value based on the request message, wherein
the abnormal response message further comprises a first hash value, and the first hash value is determined by the core network device based on the request message; and
the determining, based on the third random number, the signature, and an obtained credential, whether the abnormal response message is a valid message comprises:
if the first random number is the same as the third random number, the first hash value is the same as the second hash value, and signature verification succeeds, determining that the abnormal response message is a valid message, wherein that signature verification succeeds comprises: signature verification performed on the abnormal response message based on the third random number, the first hash value, the signature, and the credential succeeds.

6. The method according to claim 1, wherein the method further comprises: determining a second hash value based on the request message, wherein
the abnormal response message further comprises a second random number; and
the determining, based on the third random number, the signature, and an obtained credential, whether the abnormal response message is a valid message comprises:
if the first random number is the same as the third random number, and signature verification succeeds, determining that the abnormal response message is a valid message, wherein that signature verification succeeds comprises: signature verification performed on the abnormal response message based on the third random number, the second random number, the second hash value, the signature, and the credential succeeds.

7. The method according to claim 1, wherein the method further comprises: determining a second hash value based on the request message, wherein
the abnormal response message further comprises a second random number and a first hash value, and the first hash value is determined by the core network device based on the request message; and
the determining, based on the third random number, the signature, and an obtained credential, whether the abnormal response message is a valid message comprises:
if the first random number is the same as the third random number, the first hash value is the same as the second hash value, and signature verification succeeds, determining that the abnormal response message is a valid message, wherein that signature verification succeeds comprises: signature verification performed on the abnormal response message based on the third random number, the second random number, the first hash value, the signature, and the credential succeeds.

8. The method according to claim 1, wherein the request message comprises an attach request message or a tracking area update request message.

9. The method according to claim 1, wherein the abnormal response message comprises an attach reject message, a tracking area update reject message, or an identity request message.

10. The method according to claim 1, wherein the abnormal response message further comprises the credential, and the credential is used to verify the signature.

11. The method according to claim 1, wherein the method further comprises:
if the abnormal response message is an invalid message, changing an accessed access network device, and resending the request message to the core network device by using a changed access network device.

12. User equipment, comprising:
a transceiver, configured to: send a request message on which no security protection is performed to a core network device, wherein the request message comprises a first random number; and receive an abnormal response message, wherein the abnormal response message comprises a third random number and a signature; and a processor, configured to determine, based on the third random number, the signature, and an obtained credential, whether the abnormal response message is a valid message.

13. The user equipment according to claim 12, wherein the processor is specifically configured to:
    if the first random number is the same as the third random number, and signature verification succeeds, determine that the abnormal response message is a valid message, wherein that signature verification succeeds comprises: signature verification performed on the abnormal response message based on the third random number, the signature, and the credential succeeds.

14. The user equipment according to claim 12, wherein the abnormal response message further comprises a second random number, and the processor is specifically configured to:
    if the first random number is the same as the third random number, and signature verification succeeds, determine that the abnormal response message is a valid message, wherein that signature verification succeeds comprises: signature verification performed on the abnormal response message based on the third random number, the second random number, the signature, and the credential succeeds.

15. The user equipment according to claim 12, wherein the processor is further configured to determine a second hash value based on the request message; and
    the processor is specifically configured to:
    if the first random number is the same as the third random number, and signature verification succeeds, determine that the abnormal response message is a valid message, wherein that signature verification succeeds comprises: signature verification performed on the abnormal response message based on the third random number, the second hash value, the signature, and the credential succeeds.

16. The user equipment according to claim 12, wherein the processor is further configured to determine a second hash value based on the request message, wherein
    the abnormal response message further comprises a first hash value, and the first hash value is determined by the core network device based on the request message; and
    the processor is specifically configured to:
    if the first random number is the same as the third random number, the first hash value is the same as the second hash value, and signature verification succeeds, determine that the abnormal response message is a valid message, wherein that signature verification succeeds comprises: signature verification performed on the abnormal response message based on the third random number, the first hash value, the signature, and the credential succeeds.

17. The user equipment according to claim 12, wherein the processor is further configured to determine a second hash value based on the request message, wherein
    the abnormal response message further comprises a second random number; and
    the processor is specifically configured to:
    if the first random number is the same as the third random number, and signature verification succeeds, determine that the abnormal response message is a valid message, wherein that signature verification succeeds comprises: signature verification performed on the abnormal response message based on the third random number, the second random number, the second hash value, the signature, and the credential succeeds.

18. The user equipment according to claim 12, wherein the processor is further configured to determine a second hash value based on the request message, wherein
    the abnormal response message further comprises a second random number and a first hash value, and the first hash value is determined by the core network device based on the request message; and
    the processor is specifically configured to:
    if the first random number is the same as the third random number, the first hash value is the same as the second hash value, and signature verification succeeds, determine that the abnormal response message is a valid message, wherein that signature verification succeeds comprises: signature verification performed on the abnormal response message based on the third random number, the second random number, the first hash value, the signature, and the credential succeeds.

19. The user equipment according to claim 12, wherein the request message comprises an attach request message or a tracking area update request message.

20. A computer program product stored in a non-transitory medium, comprising instructions which, when executed by a computer, cause the computer to:
    send a request message on which no security protection is performed to a core network device, wherein the request message comprises a first random number;
    receive an abnormal response message, wherein the abnormal response message comprises a third random number and a signature; and
    determine, based on the third random number, the signature, and an obtained credential, whether the abnormal response message is a valid message.

* * * * *